(12) United States Patent
Oikawa et al.

(10) Patent No.: US 8,714,844 B2
(45) Date of Patent: *May 6, 2014

(54) INTERMEDIATE ADAPTER, CAMERA ACCESSORY, AND EXCHANGEABLE LENS

(71) Applicant: Nikon Corporation, Tokyo (JP)

(72) Inventors: Masafumi Oikawa, Mitaka (JP); Kazuharu Imafuji, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,784

(22) Filed: Sep. 19, 2012

(65) Prior Publication Data

US 2013/0077954 A1  Mar. 28, 2013

Related U.S. Application Data

(60) Provisional application No. 61/564,554, filed on Nov. 29, 2011.

(30) Foreign Application Priority Data

Sep. 20, 2011 (JP) ................................. 2011-205064
Aug. 31, 2012 (JP) ................................. 2012-191004

(51) Int. Cl.
*G03B 17/00* (2006.01)

(52) U.S. Cl.
USPC ........................................................ 396/530

(58) Field of Classification Search
USPC .................................................. 396/529–533
See application file for complete search history.

(56) References Cited

U.S. PATENT DOCUMENTS

| 5,065,175 | A | 11/1991 | Suzuki et al. |
| 5,089,834 | A | 2/1992 | Nakasa et al. |
| 6,336,754 | B1 * | 1/2002 | Sato et al. ..................... 396/529 |
| 6,341,902 | B1 | 1/2002 | Sato et al. |
| 8,400,722 | B2 | 3/2013 | Imafuji et al. |
| 2009/0269049 | A1 * | 10/2009 | Ueda et al. ..................... 396/529 |
| 2010/0091175 | A1 * | 4/2010 | Shintani et al. ............... 348/345 |

(Continued)

FOREIGN PATENT DOCUMENTS

| JP | A-7-234432 | 9/1995 |
| JP | A-9-211656 | 8/1997 |

(Continued)

OTHER PUBLICATIONS

Office Action issued in Japanese Patent Application No. 2012-191002 mailed Dec. 4, 2012 (with translation).

(Continued)

*Primary Examiner* — Clayton E LaBalle
*Assistant Examiner* — Dennis Hancock
(74) *Attorney, Agent, or Firm* — Oliff PLC

(57) ABSTRACT

An intermediate adapter includes: a first mount unit having a first mount center point, at which a camera body, with twelve body connector terminals disposed near a camera body mount unit at the camera body, is mounted; a body-side connector terminal holding portion where twelve body-side connector terminals, each connected to one of the twelve body connector terminals and each including a contact area to come into contact with one of the body connector terminals, are disposed; a second mount unit having a second mount center point, at which a camera accessory is to be detachably mounted.

31 Claims, 18 Drawing Sheets

(56) References Cited

U.S. PATENT DOCUMENTS

| | | | |
|---|---|---|---|
| 2011/0317062 A1 | 12/2011 | Fujino et al. | |
| 2012/0063020 A1 | 3/2012 | Imafuji et al. | |
| 2012/0195587 A1 | 8/2012 | Hasuda et al. | |
| 2013/0071102 A1* | 3/2013 | Imafuji et al. | 396/532 |
| 2013/0077955 A1* | 3/2013 | Imafuji et al. | 396/532 |
| 2013/0077956 A1* | 3/2013 | Imafuji et al. | 396/532 |
| 2013/0077957 A1* | 3/2013 | Oikawa et al. | 396/532 |

FOREIGN PATENT DOCUMENTS

| | | |
|---|---|---|
| JP | A-2008-233773 | 10/2008 |
| JP | A-2010-288307 | 12/2010 |
| JP | A-2012-155290 | 8/2012 |

OTHER PUBLICATIONS

Office Action issued in Japanese Patent Application No. 2012-191003 mailed Dec. 4, 2012 (with translation).

Office Action issued in Japanese Patent Application No. 2012-191004 mailed Dec. 4, 2012 (with translation).

Office Action issued in Japanese Patent Application No. 2012-191005 mailed Dec. 4, 2012 (with translation).

Office Action issued in Japanese Patent Application No. 2012-191006 mailed Dec. 4, 2012 (with translation).

Office Action issued in Japanese Patent Application No. 2012-191007 mailed Dec. 4, 2012 (with translation).

U.S. Appl. No. 13/622,699 in the name of Imafuji et al. filed Sep. 19, 2012.

U.S. Appl. No. 13/622,787 in the name of Imafuji et al. filed Sep. 19, 2012.

U.S. Appl. No. 13/622,711 in the name of Imafuji et al. filed Sep. 19, 2012.

U.S. Appl. No. 13/622,828 in the name of Oikawa et al. filed Sep. 19, 2012.

Oct. 22, 2013 Office Action issued in Japanese Patent Application No. 13/622,699.

May 3, 2013 Notice of Allowance issued in U.S. Appl. No. 13/622,787.

May 31, 2013 Supplemental Notice of Allowance issued in U.S. Appl. No. 13/622,787.

Apr. 30, 2013 Notice of Allowance issued in U.S. Appl. No. 13/622,711.

May 23, 2013 Corrected Notice of Allowability issued in U.S. Appl. No. 13/622,711.

May 10, 2013 Office Action issued in U.S. Appl. No. 13/622,828.

* cited by examiner

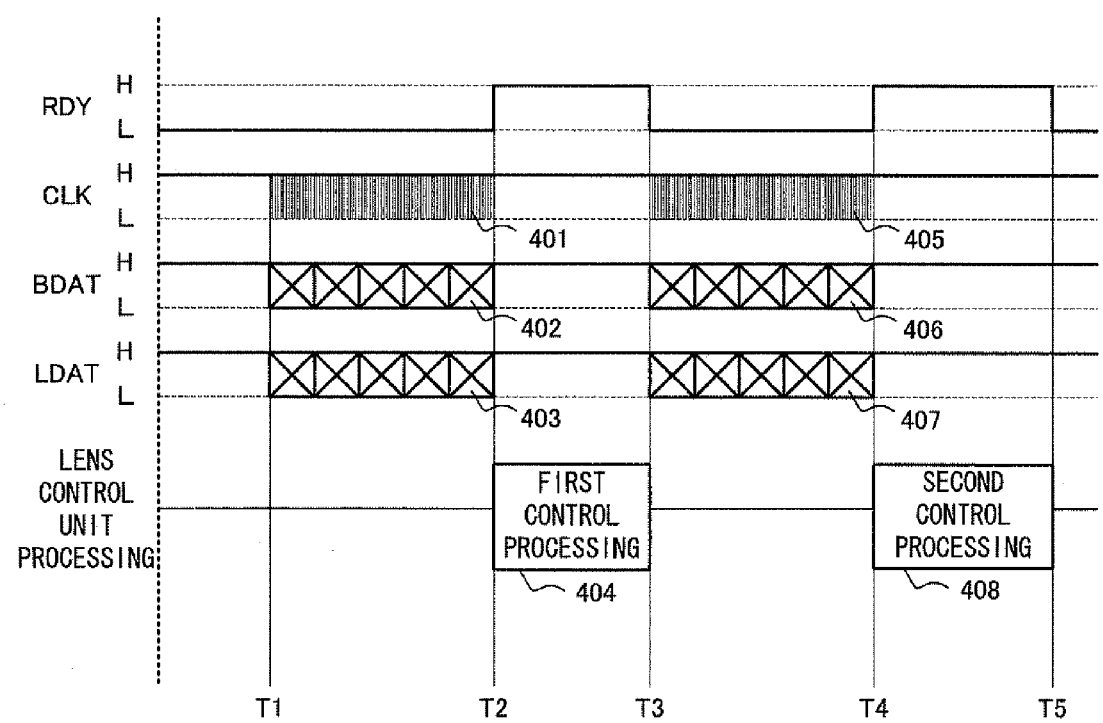

US 8,714,844 B2

INTERMEDIATE ADAPTER, CAMERA ACCESSORY, AND EXCHANGEABLE LENS

This non-provisional application claims the benefit of U.S. Provisional Application No. 61/564,554 filed Nov. 29, 2011. This application also claims priority from Japanese Application No. 2011-205064 filed Sep. 20, 2011 and Japanese Application No. 2012-191004 filed Aug. 31, 2012. The disclosure of each of the earlier applications is incorporated herein by reference in its entirety.

BACKGROUND OF THE INVENTION

1. Field of the Invention

The present invention relates to an intermediate adapter, a camera accessory and an exchangeable lens.

2. Description of Related Art

There are camera systems known in the related art that allow the camera body and an exchangeable lens to electrically communicate with each other. Japanese Laid Open Patent Publication No. H7-234432 discloses an exchangeable lens that includes a group of terminals used to communicate with a camera body and a group of terminals used to communicate with an adapter such as an intermediate ring or a rear-focus converter. These two groups of terminals form part of communication systems independent of each other, and as an adapter is mounted, the exchangeable lens first engages in communication with the adapter through one of the communication systems. Subsequently, the exchangeable lens engages in communication with the camera body through the other communication system. The terminals in each of these terminal groups are disposed so as to form a circular arc, and a group of terminals, through which power is provided from the camera body to the exchangeable lens and the adapter, is disposed next to one end of the circular arc.

SUMMARY OF THE INVENTION

As the two communication systems, configured independently of each other in conjunction with the camera body and the exchangeable lens, as described above, are simultaneously engaged in communication, the two communication operations may adversely affect each other.

An intermediate adapter according to a 1st aspect of the present invention, comprises: a first mount unit having a first mount center point, at which a camera body, with twelve body connector terminals disposed near a camera body mount unit at the camera body, is mounted; a body-side connector terminal holding portion where twelve body-side connector terminals, each connected to one of the twelve body connector terminals and each including a contact area to come into contact with one of the body connector terminals, are disposed; a second mount unit having a second mount center point, at which a camera accessory is to be detachably mounted, wherein: the twelve body-side connector terminals are: a first body-side connector terminal through which a first voltage is provided from the camera body; a second body-side connector terminal that functions as a ground terminal corresponding to the first voltage; a third body-side connector terminal through which a first clock signal is input from the camera body; a fourth body-side connector terminal through which a first data signal is input from the camera body in synchronization with the first clock signal; a fifth body-side connector terminal through which a second data signal is output to the camera body in synchronization with the first clock signal; a sixth body-side connector terminal through which a second clock signal is input from the camera body; a seventh body-side connector terminal through which a third data signal is output to the camera body in synchronization with the second clock signal; an eighth body-side connector terminal through which a first asynchronous signal that is not synchronous with either the first clock signal or the second clock signal is output to the camera body; a ninth body-side connector terminal through which a second asynchronous signal that is not synchronous with either the first clock signal or the second clock signal is input from the camera body; a tenth body-side connector terminal through which a third asynchronous signal that is not synchronous with either the first clock signal or the second clock signal is output to the camera body; an eleventh body-side connector terminal through which a second voltage smaller than the first voltage, enabling reception of the first data signal from the camera body through the fourth body-side connector terminal and transmission of the second data signal to the camera body through the fifth body-side connector terminal based upon the first asynchronous signal output through the eighth body-side connector terminal and the first clock signal input through the third body-side connector terminal and also enabling transmission of the third data signal to the camera body through the seventh body-side connector terminal based upon the second asynchronous signal input through the ninth body-side connector terminal, the third asynchronous signal output through the tenth body-side connector terminal and the second clock signal input through the sixth body-side connector terminal, is provided from the camera body; and a twelfth body-side terminal that functions as a ground terminal corresponding to the second voltage; an interior angle formed by the contact area of the first body-side connector terminal and the contact area of the eleventh body-side connector terminal at the first mount center point is largest among interior angles, each formed by contact areas of any two body-side connector terminals among the twelve body-side connector terminals at the first mount center point; an interior angle formed by the contact area of the eleventh body-side connector terminal and the contact area of the twelfth body-side connector terminal at the first mount center point is smaller than an interior angle formed by the contact area of any body-side connector terminal among the first body-side connector terminal through the tenth body-side connector terminal and the contact area of the eleventh body-side connector terminal at the first mount center point; an interior angle formed by the contact area of the third body-side connector terminal and the contact area of the eleventh body-side connector terminal at the first mount center point is smaller than an interior angle formed by the contact area of any body-side connector terminal among the first body-side connector terminal, the second body-side connector terminal and the fourth body-side connector terminal through the tenth body-side connector terminal and the contact area of the eleventh body-side connector terminal at the first mount center point; an interior angle formed by the contact area of the fourth body-side connector terminal and the contact area of the eleventh body-side connector terminal at the first mount center point is smaller than an interior angle formed by the contact area of any body-side connector terminal among the first body-side connector terminal, the second body-side connector terminal and the fifth body-side connector terminal through the tenth body-side connector terminal and the contact area of the eleventh body-side connector terminal at the first mount center point; an interior angle formed by the contact area of the fifth body-side connector terminal and the contact area of the eleventh body-side connector terminal at the first mount center point is smaller than an interior angle formed by the contact area of any body-side connector terminal among the first body-side connector terminal, the second body-side connector terminal and the sixth body-side connector terminal through the tenth body-side connector terminal and the contact area of the eleventh body-side connector terminal at the first mount center point; an interior angle formed by the contact area of the eighth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal, the ninth body-side connector terminal and the tenth body-side connector terminal and the contact area of the eleventh body-side connector terminal at the first mount center point; an interior angle formed by the contact area of the ninth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal and the tenth body-side connector terminal and the contact area of the eleventh body-side connector terminal at the first mount center point; an interior angle formed by the contact area of the tenth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal and the seventh body-side connector terminal and the contact area of the eleventh body-side connector terminal at the first mount center point; an interior angle formed by the contact area of the sixth body-side connector terminal and the contact area of the eleventh body-side connector terminal at the first mount center point is smaller than an interior angle formed by the contact area of any body-side connector terminal among the first body-side connector terminal, the second body-side connector terminal and the seventh body-side connector terminal and the contact area of the eleventh body-side connector terminal at the first mount center point; an interior angle formed by the contact area of the seventh body-side connector terminal and the contact area of the eleventh body-side connector terminal at the first mount center point is smaller than an interior angle formed by the contact area of either the first body-side connector terminal or the second body-side connector terminal and the contact area of the eleventh body-side connector terminal at the first mount center point; and an interior angle formed by the contact area of the second body-side connector terminal and the contact area of the eleventh body-side connector terminal at the first mount center point is smaller than an interior angle formed by the contact area of the first body-side connector terminal and the contact area of the eleventh body-side connector terminal at the first mount center point.

According to a 2nd aspect of the present invention, in the intermediate adapter according to the 1st aspect, a distance setting apart a center of at least one body-side connector terminal among the twelve body-side connector terminals from the first mount center point may be different from a distance setting apart a center of at least one other body-side connector terminal, from the first mount center point.

According to a 3rd aspect of the present invention, the intermediate adapter according to the 1st or 2nd aspect may further comprise: an accessory-side connector terminal holding portion where a plurality of accessory-side connector terminals, each electrically connected to one of the twelve body-side connector terminals and each including a contact area to come into contact with one accessory connector terminal, are disposed.

According to a 4th aspect of the present invention, in the intermediate adapter according to the 3rd aspect, it is preferable that at least two accessory-side connector terminals among the plurality of accessory-side connector terminals have a positional relationship relative to each other along a circumferential direction running along a circumference of a circle centered on the second mount center point, which is different from a positional relationship between at least two body-side connector terminals among the twelve body-side connector terminals assumed along a circumference of a circle centered on the first mount center point.

According to a 5th aspect of the present invention, the intermediate adapter according to the 3rd aspect may comprise: the accessory-side connector terminal holding portion where twelve accessory-side connector terminals, each electrically connected to one of the twelve body-side connector terminals and each including the contact area to come into contact with one accessory connector terminal, are disposed, wherein: the twelve accessory-side connector terminals are each connected to one of twelve accessory connector terminals disposed near a mount unit at the camera accessory that can be detachably mounted at the second mount unit.

According to a 6th aspect of the present invention, in the intermediate adapter according to the 5th aspect, it is preferable that at least two accessory-side connector terminals among the twelve accessory-side connector terminals have a positional relationship relative to each other along a circumferential direction running along a circumference of a circle centered on the second mount center point, which is different from a positional relationship between at least two body-side connector terminals among the twelve body-side connector terminals assumed along a circumference of a circle centered on the first mount center point.

An intermediate adapter according to a 7th aspect of the present invention comprises: a first mount unit having a first mount center point, at which a camera body, with twelve body connector terminals disposed near a camera body mount unit at the camera body, is mounted; a body-side connector terminal holding portion where at least five body-side connector terminals, each including a contact area to come into contact with one of the body connector terminals, are disposed; and a second mount unit having a second mount center point at which a camera accessory is to be detachably mounted, wherein: the five body-side connector terminals are: a clock input body-side connector terminal through which a clock signal from the camera body is input; a data input body-side connector terminal through which a first data signal from the camera body is input in synchronization with the clock signal; a data output body-side connector terminal through which a second data signal is output to the camera body in synchronization with the clock signal; an asynchronous signal output body-side connector terminal through which an asynchronous signal that is not synchronous with the clock signal is output to the camera body; and a voltage supply body-side connector terminal through which an operating voltage, enabling reception of the first data signal from the camera body through the data input body-side connector terminal and transmission of the second data signal to the camera body through the data output body-side connector terminal based upon the asynchronous signal output through the asynchronous signal output body-side connector terminal and the clock signal input through the clock input body-side connector terminal, is provided from the camera body; an interior angle formed by the contact area of the asynchronous signal output body-side connector terminal and the contact area of the voltage supply body-side connector terminal at the first mount center point is largest among interior angles, each formed by contact areas of any two body-side connector terminals among the five body-side connector terminals at the first mount center point; an interior angle formed by the contact area of the clock input body-side connector terminal and the contact area of the voltage supply body-side connector terminal at the first mount center point is smaller than an interior angle formed by the contact area of any body-side connector terminal among the data input body-side connector terminal, the data output body-side connector terminal and the asynchronous signal output body-side connector terminal and the contact area of the voltage supply body-side connector terminal at the first mount center point; an interior angle formed by the contact area of the data input body-side connector terminal and the contact area of the voltage supply body-side connector terminal at the first mount center point is smaller than an interior angle formed by the contact area of either the data output body-side connector terminal or the asynchronous signal output body-side connector terminal and the contact area of the voltage supply body-side connector terminal at the first mount center point; and an interior angle formed by the contact area of the data output body-side connector terminal and the contact area of the voltage supply body-side connector terminal at the first mount center point is smaller than an interior angle formed by the contact area of the asynchronous signal output body-side connector terminal and the contact area of the voltage supply body-side connector terminal at the first mount center point.

According to an 8th aspect of the present invention, in the intermediate adapter according to the 7th aspect, a distance setting apart a center of at least one body-side connector terminal among the five body-side terminals from the first mount center point may be different from a distance setting apart a center of at least one other body-side connector terminal from the first mount center point.

According to a 9th aspect of the present invention, the intermediate adapter according to the 7th or 8th aspect may further comprise: an accessory-side connector terminal holding portion where a plurality of accessory-side connector terminals, each electrically connected to one of the five body-side connector terminals and each including a contact area to come into contact with one accessory connector terminal, are disposed.

According to a 10th aspect of the present invention, in the intermediate adapter according to the 9th aspect, it is preferable that at least two accessory-side connector terminals among the plurality of accessory-side connector terminals have a positional relationship relative to each other along a circumferential direction running along a circumference of a circle centered on the second mount center point, which is different from a positional relationship between at least two body-side connector terminals among the five body-side connector terminals assumed along a circumference of a circle centered on the first mount center point.

According to an 11th aspect of the present invention, the intermediate adapter according to the 9th aspect may comprise: the accessory-side connector terminal holding portion where at least five accessory-side connector terminals, each electrically connected to one of the five body-side connector terminals and each including the contact area to come into contact with one accessory connector terminal, are disposed, wherein: the five accessory-side connector terminals are each connected to one of at least five accessory connector terminals disposed near mount unit of the camera accessory that can be detachably mounted at the second mount unit.

According to a 12th aspect of the present invention, in the intermediate adapter according to the 11th aspect, it is preferable that at least two accessory-side connector terminals among the five accessory-side connector terminals have a positional relationship relative to each other along a circumferential direction running along a circumference of a circle centered on the second mount center point, which is different from a positional relationship between at least two body-side connector terminals among the five body-side connector terminals assumed along a circumference of a circle centered on the first mount center point.

An intermediate adapter according to a 13th aspect of the present invention comprises: a first mount unit having a first mount center point, at which a camera body, with twelve body connector terminals disposed near a camera body mount unit at the camera body, is mounted; a body-side connector terminal holding portion where twelve body-side connector terminals, each connected to one of the twelve body connector terminals and each including a contact area to come into contact with one of the body connector terminals, are disposed; a second mount unit having a second mount center point, at which a camera accessory is to be detachably mounted, wherein: the twelve body-side connector terminals, each including a body-side exposed area exposed at a surface of the body-side connector terminal holding portion, are: a first body-side connector terminal through which a first voltage is provided from the camera body; a second body-side connector terminal that functions as a ground terminal corresponding to the first voltage; a third body-side connector terminal through which a first clock signal is input from the camera body; a fourth body-side connector terminal through which a first data signal is input from the camera body in synchronization with the first clock signal; a fifth body-side connector terminal through which a second data signal is output to the camera body in synchronization with the first clock signal; a sixth body-side connector terminal through which a second clock signal is input from the camera body; a seventh body-side connector terminal through which a third data signal is output to the camera body in synchronization with the second clock signal; an eighth body-side connector terminal through which a first asynchronous signal that is not synchronous with either the first clock signal or the second clock signal is output to the camera body; a ninth body-side connector terminal through which a second asynchronous signal that is not synchronous with either the first clock signal or the second clock signal is input from the camera body; a tenth body-side connector terminal through which a third asynchronous signal that is not synchronous with either the first clock signal or the second clock signal is output to the camera body; an eleventh body-side connector terminal through which a second voltage smaller than the first voltage, enabling reception of the first data signal from the camera body through the fourth body-side connector terminal and transmission of the second data signal to the camera body through the fifth body-side connector terminal based upon the first asynchronous signal output through the eighth body-side connector terminal and the first clock signal input through the third body-side connector terminal and also enabling transmission of the third data signal to the camera body through the seventh body-side connector terminal based upon the second asynchronous signal input through the ninth body-side connector terminal, the third asynchronous signal output through the tenth body-side connector terminal and the second clock signal input through the sixth body-side connector terminal, is provided from the camera body; and a twelfth body-side terminal that functions as a ground terminal corresponding to the second voltage; an interior angle formed by the contact area of the first body-side connector terminal and the contact area of the eleventh body-side connector terminal at the first mount center point is largest among interior angles, each formed by contact areas of any two body-side connector terminals among the twelve body-side connector terminals at the first mount center point; an interior angle formed by the contact area of the eleventh body-side connector terminal and the contact area of the twelfth body-side connector terminal at the first mount center point is smaller than an interior angle formed by the contact area of any body-side connector terminal among the first body-side connector terminal through the tenth body-side connector terminal and the contact area of the eleventh body-side connector terminal at the first mount center point; an interior angle formed by the contact area of the third body-side connector terminal and the contact area of the eleventh body-side connector terminal at the first mount center point is smaller than an interior angle formed by the contact area of any body-side connector terminal among the first body-side connector terminal, the second body-side connector terminal and the fourth body-side connector terminal through the tenth body-side connector terminal and the contact area of the eleventh body-side connector terminal at the first mount center point; an interior angle formed by the contact area of the fourth body-side connector terminal and the contact area of the eleventh body-side connector terminal at the first mount center point is smaller than an interior angle formed by the contact area of any body-side connector terminal among the first body-side connector terminal, the second body-side connector terminal and the fifth body-side connector terminal through the tenth body-side connector terminal and the contact area of the eleventh body-side connector terminal at the first mount center point; an interior angle formed by the contact area of the fifth body-side connector terminal and the contact area of the eleventh body-side connector terminal at the first mount center point is smaller than an interior angle formed by the contact area of any body-side connector terminal among the first body-side connector terminal, the second body-side connector terminal and the sixth body-side connector terminal through the tenth body-side connector terminal and the contact area of the eleventh body-side connector terminal at the first mount center point; an interior angle formed by the contact area of the eighth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal, the ninth body-side connector terminal and the tenth body-side connector terminal and the contact area of the eleventh body-side connector terminal at the first mount center point; an interior angle formed by the contact area of the ninth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal and the tenth body-side connector terminal and the contact area of the eleventh body-side connector terminal at the first mount center point; an interior angle formed by the contact area of the tenth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal and the seventh body-side connector terminal and the contact area of the eleventh body-side connector terminal at the first mount center point; an interior angle formed by the contact area of the sixth body-side connector terminal and the contact area of the eleventh body-side connector terminal at the first mount center point is smaller than an interior angle formed by the contact area of any body-side connector terminal among the first body-side connector terminal, the second body-side connector terminal and the seventh body-side connector terminal and the contact area of the eleventh body-side connector terminal at the first mount center point; an interior angle formed by the contact area of the seventh body-side connector terminal and the contact area of the eleventh body-side connector terminal at the first mount center point is smaller than an interior angle formed by the contact area of either the first body-side connector terminal or the second body-side connector terminal and the contact area of the eleventh body-side connector terminal at the first mount center point; and an interior angle formed by the contact area of the second body-side connector terminal and the contact area of the eleventh body-side connector terminal at the first mount center point is smaller than an interior angle formed by the contact area of the first body-side connector terminal and the contact area of the eleventh body-side connector terminal at the first mount center point.

According to a 14th aspect of the present invention, in the intermediate adapter according to the 13th aspect, a distance setting apart a center of the body-side exposed area of at least one body-side connector terminal, among the twelve body-side connector terminals, from the first mount center point may be different from a distance setting apart a center of the body-side exposed area of at least one other body-side connector terminal from the first mount center point.

According to a 15th aspect of the present invention, the intermediate adapter according to the 13th or 14th aspect may further comprise: an accessory-side connector terminal holding portion where a plurality of accessory-side connector terminals, each electrically connected to one of the twelve body-side connector terminals and each including a contact area to come into contact with one accessory connector terminal, are disposed, wherein: the plurality of accessory-side connector terminals each include an accessory-side exposed area exposed at a surface of the accessory-side connector terminal holding portion.

According to a 16th aspect of the present invention, in the intermediate adapter according to the 15th aspect, it is preferable that accessory-side exposed areas of at least two accessory-side connector terminals among the plurality of accessory-side connector terminals have a positional relationship relative to each other along a circumferential direction running along a circumference of a circle centered on the second mount center point, which is different from a positional relationship between body-side exposed areas of at least two body-side connector terminals among the twelve body-side connector terminals assumed along the circumference of a circle centered on the first mount center point.

According to a 17th aspect of the present invention, the intermediate adapter according to the 15th aspect may comprise: the accessory-side connector terminal holding portion where twelve accessory-side connector terminals, each electrically connected to one of the twelve body-side connector terminals and each including the contact area to come into contact with one accessory connector terminal, are disposed, wherein: the twelve accessory-side connector terminals each include an accessory-side exposed area exposed at a surface of the accessory-side connector terminal holding portion and are each connected to one of twelve accessory connector terminals disposed near a mount unit at the camera accessory that can be detachably mounted at the second mount unit.

According to an 18th aspect of the present invention, in the intermediate adapter according to the 17th aspect, it is preferable that accessory-side exposed areas of at least two accessory-side connector terminals among the twelve accessory-side connector terminals have a positional relationship relative to each other along a circumferential direction running along a circumference of a circle centered on the second mount center point, which is different from a positional relationship between body-side exposed areas of at least two body-side connector terminals among the twelve body-side connector terminals assumed along a circumference of a circle centered on the first mount center point.

An intermediate adapter according to a 19th aspect of the present invention comprises: a first mount unit having a first mount center point, at which a camera body, with twelve body connector terminals disposed near a camera body mount unit at the camera body, is mounted; a body-side connector terminal holding portion where at least five body-side connector terminals, each including a contact area to come into contact with one of the body connector terminals, are disposed; and a second mount unit having a second mount center point, at which a camera accessory can be detachably mounted, wherein: the five body-side connector terminals, each including a body-side exposed area exposed at a surface of the body-side connector terminal holding portion, are: a clock input body-side connector terminal through which a clock signal from the camera body is input; a data input body-side connector terminal through which a first data signal from the camera body is input in synchronization with the clock signal; a data output body-side connector terminal through which a second data signal is output to the camera body in synchronization with the clock signal; an asynchronous signal output body-side connector terminal through which an asynchronous signal that is not synchronous with the clock signal is output to the camera body; and a voltage supply body-side connector terminal through which an operating voltage, enabling reception of the first data signal from the camera body through the data input body-side connector terminal and transmission of the second data signal to the camera body through the data output body-side connector terminal based upon the asynchronous signal output through the asynchronous signal output body-side connector terminal and the clock signal input through the clock input body-side connector terminal, is provided from the camera body; an interior angle formed by the contact area of the asynchronous signal output body-side connector terminal and the contact area of the voltage supply body-side connector terminal at the first mount center point is largest among interior angles, each formed by contact areas of any two body-side connector terminals among the five body-side connector terminals at the first mount center point; an interior angle formed by the contact area of the clock input body-side connector terminal and the contact area of the voltage supply body-side connector terminal at the first mount center point is smaller than an interior angle formed by the contact area of any body-side connector terminal among the data input body-side connector terminal, the data output body-side connector terminal and the asynchronous signal output body-side connector terminal and the contact area of the voltage supply body-side connector terminal at the first mount center point; an interior angle formed by the contact area of the data input body-side connector terminal and the contact area of the voltage supply body-side connector terminal at the first mount center point is smaller than an interior angle formed by the contact area of either the data output body-side connector terminal or the asynchronous signal output body-side connector terminal and the contact area of the voltage supply body-side connector terminal at the first mount center point; and an interior angle formed by the contact area of the data output body-side connector terminal and the contact area of the voltage supply body-side connector terminal is smaller than an interior angle formed by the contact area of the asynchronous signal output body-side connector terminal and the contact area of the voltage supply body-side connector terminal.

According to a 20th aspect of the present invention, in the intermediate adapter according to the 19th aspect, a distance setting apart a center of the body-side exposed area of at least one body-side connector terminal among the five body-side terminals from the first mount center point may be different from a distance setting apart a center of the body-side exposed area of at least one other body-side connector terminal from the first mount center point.

According to a 21st aspect of the present invention, the intermediate adapter according to the 19th or 20th may further comprise: an accessory-side connector terminal holding portion where a plurality of accessory-side connector terminals, each electrically connected to one of the five body-side connector terminals and each including a contact area to come into contact with one accessory connector terminal, are disposed, wherein: the plurality of accessory-side connector terminals each include an accessory-side exposed area exposed at a surface of the accessory-side connector terminal holding portion.

According to a 22nd aspect of the present invention, in the intermediate adapter according to the 21st aspect, it is preferable that accessory-side exposed areas of at least two accessory-side connector terminals among the plurality of accessory-side connector terminals have a positional relationship relative to each other along a circumferential direction running along a circumference of a circle centered on the second mount center point, which is different from a positional relationship between body-side exposed areas of at least two body-side connector terminals among the five body-side connector terminals along a circumference of a circle centered on the first mount center point.

According to a 23rd aspect of the present invention, the intermediate adapter according to the 21st aspect may comprise: the accessory-side connector terminal holding portion where at least five accessory-side connector terminals, each electrically connected to one of the five body-side connector terminals and each including the contact area to come into contact with one accessory connector terminal, are disposed, wherein: the five accessory-side connector terminals each include an accessory-side exposed area exposed at the surface of the accessory-side connector terminal holding portion and are each connected to one of at least five accessory connector terminals disposed near a mount unit at the camera accessory that can be detachably mounted at the second mount unit.

According to a 24th aspect of the present invention, in the intermediate adapter according to the 18th or 19th aspect, it is preferable that a positional relationship between accessory-side exposed areas of at least two accessory-side connector terminals among the five accessory-side connector terminals, assumed relative to the second mount center point, is different from a positional relationship between body-side exposed areas of at least two body-side connector terminals among the five body-side connector terminals, assumed relative to the first mount center point.

According to a 25th aspect of the present invention, the intermediate adapter according to the 1st or 13th aspect may further comprise: an accessory-side connector terminal holding portion where a plurality of accessory-side connector terminals are disposed; a communication unit to be engaged in data communication with the camera body and the camera accessory; and a control data exchange unit that receives, via the communication unit, first control data expressing a specific control instruction from the camera body and transmits, upon receiving the first control data, second control data expressing the control instruction, which are different from the first control data, through at least one of the twelve body-side connector terminals to the camera accessory via the communication unit.

According to a 26th aspect of the present invention, the intermediate adapter according to the 7th or 19th aspect may further comprise: an accessory-side connector terminal holding portion where a plurality of accessory-side connector terminals are disposed; a communication unit to be engaged in data communication with the camera body and the camera accessory; and a control data exchange unit that receives, via the communication unit, first control data expressing a specific control instruction from the camera body and transmits, upon receiving the first control data, second control data expressing the control instruction, which are different from the first control data, through at least one of the five body-side connector terminals to the camera accessory via the communication unit.

According to a 27th aspect of the present invention, the intermediate adapter according to any one of the 1st through 26th aspects may further comprise: an optical member that outputs subject light, having been transmitted through an image forming optical system included in the camera accessory to the camera body.

A camera accessory according to a 28th aspect of the present invention comprises: a first mount unit having a first mount center point, at which an intermediate adapter with twelve adapter connector terminals disposed near an adapter mount unit at the intermediate adapter, is attached; an adapter-side connector terminal holding portion where twelve adapter-side connector terminals, each connected to one of the twelve adapter connector terminals and each including a contact area to come into contact with one of the adapter connector terminals, are disposed; a second mount unit having a second mount center point, at which a camera accessory can be detachably mounted; and an accessory-side connector terminal holding portion where twelve accessory-side connector terminals, each electrically connected to one of the twelve adapter-side connector terminals and each including a contact area to come into contact with an accessory connector terminal, are disposed, wherein: the twelve adapter-side connector terminals are: a first adapter-side connector terminal through which a first voltage is provided from the intermediate adapter; a second adapter-side connector terminal that functions as a ground terminal corresponding to the first voltage; a third adapter-side connector terminal through which a first clock signal is input from the intermediate adapter; a fourth adapter-side connector terminal through which a first data signal is input from the intermediate adapter in synchronization with the first clock signal; a fifth adapter-side connector terminal through which a second data signal is output to the intermediate adapter in synchronization with the first clock signal; a sixth adapter-side connector terminal through which a second clock signal is input from the intermediate adapter; a seventh adapter-side connector terminal through which a third data signal is output to the intermediate adapter in synchronization with the second clock signal; an eighth adapter-side connector terminal through which a first asynchronous signal that is not synchronous with the first clock signal or the second clock signal is output to the intermediate adapter; a ninth adapter-side connector terminal through which a second asynchronous signal that is not synchronous with the first clock signal or the second clock signal is input from the intermediate adapter; a tenth adapter-side connector terminal through which a third asynchronous signal that is not synchronous with the first clock signal or the second clock signal is output to the intermediate adapter; an eleventh adapter-side connector terminal through which a second voltage, smaller than the first voltage, enabling reception of the first data signal from the intermediate adapter through the fourth adapter-side connector terminal and transmission of the second data signal to the intermediate adapter through the fifth adapter-side connector terminal based upon the first asynchronous signal output through the eighth adapter-side connector terminal and the first clock signal input through the third adapter-side connector terminal and also enabling transmission of the third data signal to the intermediate adapter through the seventh adapter-side connector terminal based upon the second asynchronous signal input through the ninth adapter-side connector terminal, the third asynchronous signal output through the tenth adapter-side connector terminal and the second clock signal input through the sixth adapter-side connector terminal, is provided from the intermediate adapter; and a twelfth adapter-side connector terminal that functions as a ground terminal corresponding to the second voltage; and at least two accessory-side connector terminals among the twelve accessory-side connector terminals have a positional relationship relative to each other along a circumferential direction running along a circumference of a circle centered on the second mount center point, which is different from a positional relationship between at least two adapter-side connector terminals among the twelve adapter-side connector terminals assumed along a circumference of a circle centered on the first mount center point.

A camera accessory according to a 29th aspect of the present invention comprises: a first mount unit having a first mount center point, at which an intermediate adapter with at least five adapter connector terminals disposed near an adapter mount unit at the intermediate adapter, is attached; an adapter-side connector terminal holding portion where at least five adapter-side connector terminals, each including a contact area to come into contact with one of the adapter connector terminals, are disposed; a second mount unit having a second mount center point, at which a camera accessory can be detachably mounted; and an accessory-side connector terminal holding portion where at least five accessory-side connector terminals, each electrically connected to one of the five adapter-side connector terminals and each including a contact area to come into contact with an accessory connector terminal, are disposed, wherein: the five adapter-side connector terminals are: a clock input adapter-side connector terminal through which a clock signal is input from the intermediate adapter; a data input adapter-side connector terminal through which a first data signal is input from the intermediate adapter in synchronization with the clock signal; a data output adapter-side connector terminal through which a second data signal is output to the intermediate adapter in synchronization with the clock signal; an asynchronous signal output adapter-side connector terminal through which an asynchronous signal that is not synchronous with the clock signal is output to the intermediate adapter; and a voltage supply adapter-side connector terminal through which an operating voltage, enabling reception of the first data signal from the intermediate adapter through the data input adapter-side connector terminal and transmission of the second data signal to the intermediate adapter through the data output adapter-side connector terminal based upon the asynchronous signal output through the asynchronous signal output adapter-side connector terminal and the clock signal input through the clock input adapter-side connector terminal, is provided from the intermediate adapter; and at least two accessory-side connector terminals among the five accessory-side connector terminals have a positional relationship relative to each other along a circumferential direction running along a circumference of a circle centered on the second mount center point, which is different from a positional relationship between at least two adapter-side connector terminals among the five adapter-side connector terminals assumed along a circumference of a circle centered on the first mount center point.

An exchangeable lens according to a 30th aspect of the present invention comprises: a mount unit having a mount center point, at which an intermediate adapter with twelve adapter connector terminals disposed near an adapter mount unit at the camera body, is attached; and a lens-side connector terminal holding portion where twelve lens-side connector terminals, each connected to one of the twelve adapter connector terminals and each including a contact area to come into contact with one of the adapter connector terminals, are disposed, wherein: the twelve lens-side connector terminals are: a first lens-side connector terminal through which a first voltage is provided from the intermediate adapter; a second lens-side connector terminal that functions as a ground terminal corresponding to the first voltage; a third lens-side connector terminal through which a first clock signal is input from the intermediate adapter; a fourth lens-side connector terminal through which a first data signal is input from the intermediate adapter in synchronization with the first clock signal; a fifth lens-side connector terminal through which a second data signal is output to the intermediate adapter in synchronization with the first clock signal; a sixth lens-side connector terminal through which a second clock signal is input from the intermediate adapter; a seventh lens-side connector terminal through which a third data signal is output to the intermediate adapter in synchronization with the second clock signal; an eighth lens-side connector terminal through which a first asynchronous signal that is not synchronous with the first clock signal or the second clock signal is output to the intermediate adapter; a ninth lens-side connector terminal through which a second asynchronous signal that is not synchronous with the first clock signal or the second clock signal is input from the intermediate adapter; a tenth lens-side connector terminal through which a third asynchronous signal that is not synchronous with the first clock signal or the second clock signal is output to the intermediate adapter; an eleventh lens-side connector terminal through which a second voltage, smaller than the first voltage, enabling reception of the first data signal from the intermediate adapter through the fourth lens-side connector terminal and transmission of the second data signal to the intermediate adapter through the fifth lens-side connector terminal based upon the first asynchronous signal output through the eighth lens-side connector terminal and the first clock signal input through the third lens-side connector terminal and also enabling transmission of the third data signal to the intermediate adapter through the seventh lens-side connector terminal based upon the second asynchronous signal input through the ninth lens-side connector terminal, the third asynchronous signal output through the tenth lens-side connector terminal and the second clock signal input through the sixth lens-side connector terminal, is provided from the intermediate adapter; and a twelfth lens-side connector terminal that functions as a ground terminal corresponding to the second voltage; and at least two lens-side connector terminals among the twelve lens-side connector terminals have a positional relationship relative to each other along a circumferential direction running along a circumference of a circle centered on the mount center point, which is different from a positional relationship between at least two adapter connector terminals among the twelve adapter connector terminals assumed along a circumference of a circle centered on the mount center point.

An exchangeable lens according to a 31st aspect of the present invention comprises: a mount unit having a mount center point, at which an intermediate adapter with at least five adapter connector terminals disposed near an adapter mount unit at the intermediate adapter, is attached; and a lens-side connector terminal holding portion where at least five lens-side connector terminals, each connected to one of the five adapter connector terminals and each including a contact area to come into contact with one of the adapter connector terminals, are disposed, wherein: the five lens-side connector terminals are: a clock input lens-side connector terminal through which a clock signal is input from the intermediate adapter; a data input lens-side connector terminal through which a first data signal is input from the intermediate adapter in synchronization with the clock signal; a data output lens-side connector terminal through which a second data signal is output to the intermediate adapter in synchronization with the clock signal; an asynchronous signal output lens-side connector terminal through which an asynchronous signal that is not synchronous with the clock signal is output to the intermediate adapter; and a voltage supply lens-side connector terminal through which an operating voltage, enabling reception of the first data signal from the intermediate adapter through the data input lens-side connector terminal and transmission of the second data signal to the intermediate adapter through the data output lens-side connector terminal based upon the asynchronous signal output through the asynchronous signal output lens-side connector terminal and the clock signal input through the clock input lens-side connector terminal, is provided from the intermediate adapter; and at least two lens-side connector terminals among the five lens-side connector terminals have a positional relationship relative to each other along a circumferential direction running along a circumference of a circle centered on the mount center point, which is different from a positional relationship between at least two adapter connector terminals among the five adapter connector terminals assumed along a circumference of a circle centered on the mount center point.

BRIEF DESCRIPTION OF THE DRAWINGS

FIG. 3 schematically illustrates a mode of connection that may be adopted in conjunction with the various terminals present at the camera body, the exchangeable lens and in between.

FIG. 8 is a timing chart indicating the timing with which command data communication may be executed.

FIG. 11 schematically illustrates a mode of connection that may be adopted in conjunction with the various terminals present at the camera body, the exchangeable lens and in between.

FIG. 18 schematically illustrates a mode of connection that may be adopted in conjunction with the various terminals present at the camera body, the exchangeable lens and those between.

DESCRIPTION OF PREFERRED EMBODIMENTS (First Embodiment)

Figure 1:
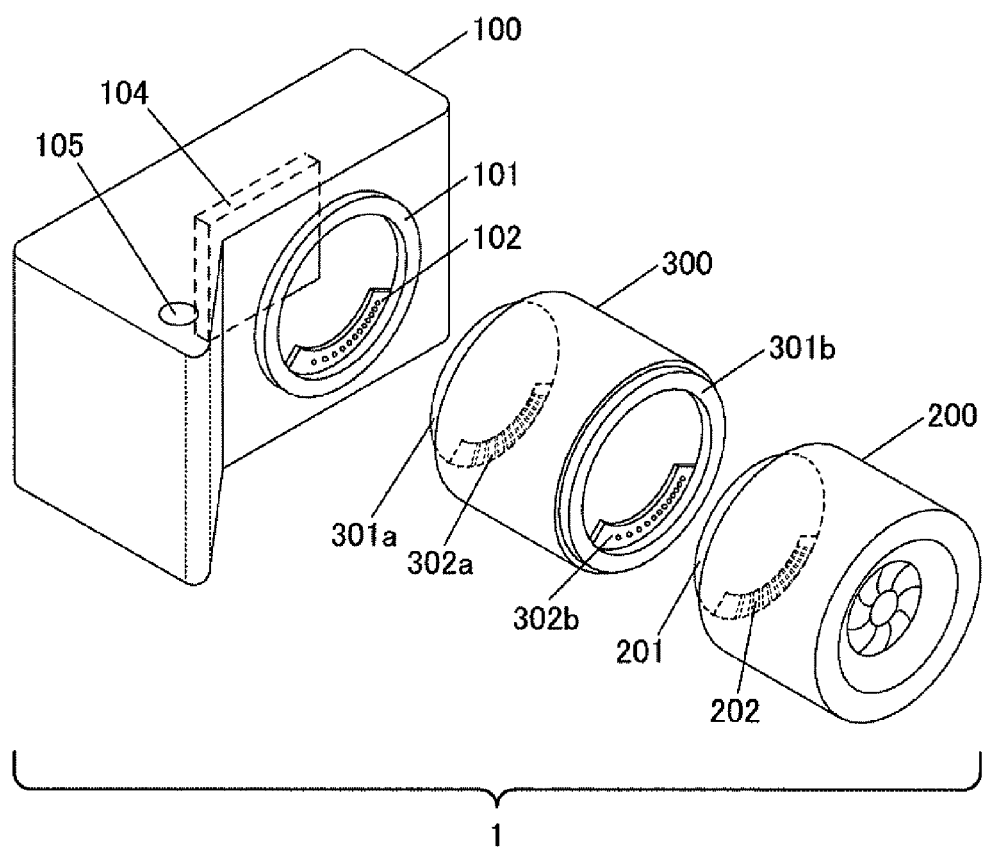
FIG. 1 is a perspective of a camera system compatible with exchangeable lenses achieved in a first embodiment of the present invention.

FIG. 1 is a perspective of a camera system compatible with exchangeable lenses, achieved in the first embodiment of the present invention. It is to be noted that FIG. 1 only shows the units and devices relevant to the present invention and that an illustration and an explanation of other units and devices are not provided. A camera system 1 comprises a camera body 100 and an exchangeable lens (photographic lens) 200 and an intermediate adapter 300 mounted between the camera body 100 and the exchangeable lens 200.

The camera body 100 includes a camera body mount unit 101 at which the intermediate adapter 300 is detachably mounted. A holding portion (electrical connector portion) 102, projecting out on the inner circumferential side of the camera body mount unit 101 over part of the inner circumference, with twelve body connector terminals held thereat, is disposed in an area near the camera body mount unit 101 (on the inner circumferential side of the camera body mount unit 101).

In addition, a camera lens mount unit 201, at which the intermediate adapter 300 is detachably mounted, is disposed at the exchangeable lens 200. A holding portion (electrical connector portion) 202, projecting out on the inner circumferential side of the camera lens mount unit 201 over part of the inner circumference, with twelve lens connector terminals held thereat, is disposed in an area near the camera lens mount unit 201 (on the inner circumferential side of the camera lens mount unit 201).

The intermediate adapter 300 includes a cylindrical casing with a body-side mount unit 301a (hereafter referred to as the B mount unit 301a) disposed at a bottom surface located on one side thereof and a lens-side mount unit 301b (hereafter referred to as the L mount unit 301b) disposed at a bottom surface located on the other side thereof. At the B mount unit 301a, which corresponds to the camera body mount unit 101, the camera body 100 can be detachably mounted. Likewise, at the L mount unit 301b, which corresponds to the camera lens mount unit 201, the exchangeable lens 200 can be detachably mounted. It is to be noted that the intermediate adapter 300 may assume a shape other than that of a circular column.

A body-side connector terminal holding portion 302a (hereafter referred to as the B holding portion 302a), a part which projects out toward the inner circumferential side of the B mount unit 301a, with twelve body-side connector terminals held thereat, is disposed in an area near the B mount unit 301a (on the inner circumferential side of the B mount unit 301a). In addition, a lens-side connector terminal holding portion 302b (hereafter referred to as the L holding portion 302b), a part which projects out toward the inner circumferential side of the L mount unit 301b, with twelve lens-side connector terminals held thereat, is disposed in an area near the L mount unit 301b (on the inner circumferential side of the L mount unit 301b).

As the camera body 100 is engaged with the intermediate adapter 300, the plurality of body connector terminals disposed at the holding portion 102 become electrically and physically connected with the plurality of body-side connector terminals disposed at the B holding portion 302a. In addition, as the exchangeable lens 200 is engaged with the intermediate adapter 300, the plurality of lens connector terminals disposed at the holding portion 202 become electrically and physically connected with the plurality of lens-side connector terminals disposed at the L holding portion 302b. Through these terminals, power from the camera body 100 is provided to the exchangeable lens 200 via the intermediate adapter 300 and signals are exchanged between the camera body 100 and the exchangeable lens 200 via the intermediate adapter 300. The holding portion 102, the holding portion 202, the B holding portion 302a and the L holding portion 302b will be described in detail later.

An image sensor 104 is disposed inside the camera body 100 at a position rearward relative to the camera body mount unit 101. A button 105, functioning as an input device, is disposed on the top side of the camera body 100. The user is able to issue a photographing instruction, a photographing condition setting instruction or the like to the camera body 100 by operating an input device such as the button 105.

Figure 2:
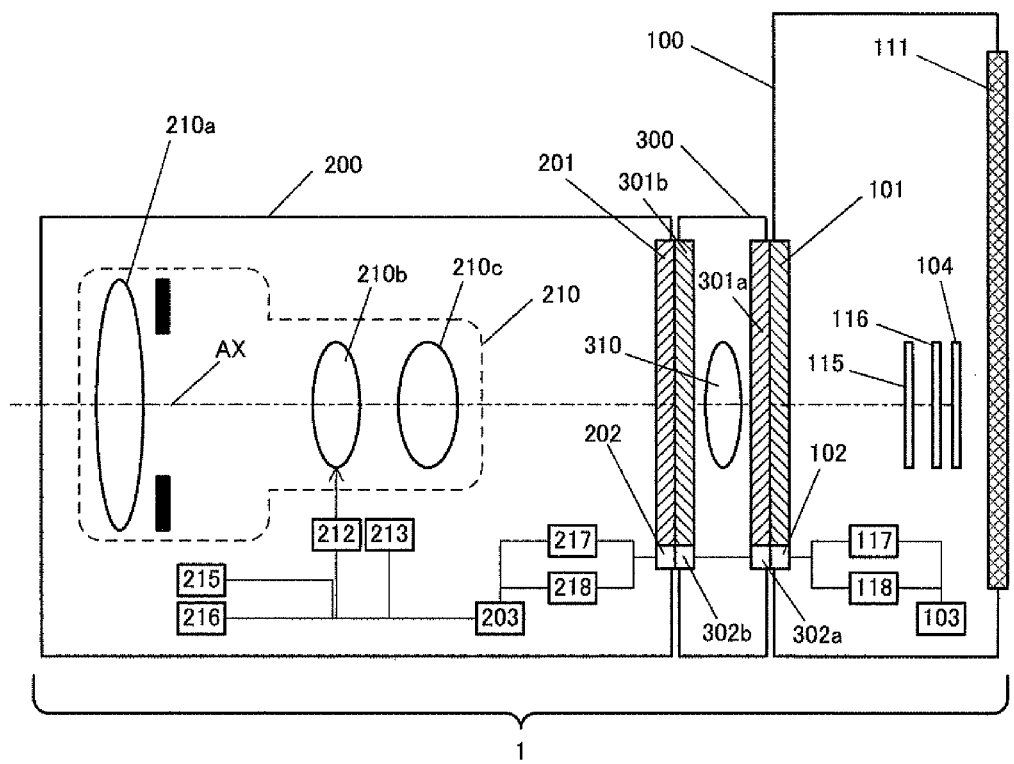
FIG. 2 is a sectional view of the camera system compatible with exchangeable lenses achieved in the first embodiment of the present invention.

FIG. 2 shows a camera system compatible with exchangeable lenses adopting the present invention in a sectional view. The exchangeable lens 200 includes an image forming optical system 210 via which a subject image is formed. The image forming optical system 210 is constituted with a plurality of lenses 210a through 210e. The plurality of lenses 210a through 210c includes a focusing lens 210b.

A lens control unit 203, which controls the various components constituting the exchangeable lens 200, is disposed inside the exchangeable lens 200. The lens control unit 203 comprises a microcomputer, its peripheral circuits and the like (none shown). A first lens-side communication unit 217, a second lens-side communication unit 218, a lens drive unit 212, a lens position detection unit 213, a ROM 215 and a RAM 216 are connected to the lens control unit 203.

The first lens-side communication unit 217 and the second lens-side communication unit 218 exchange data with the camera body 100 via the lens connector terminals disposed in the holding portion 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces, as will be explained later.

The lens drive unit 212, which includes an actuator such as a stepping motor, drives the focusing lens 210b in response to a signal input to the lens drive unit 212. The lens position detection unit 213 detects the position of the focusing lens 210b by, for instance, counting the number of signal pulses input to the stepping motor in the lens drive unit 212. It may instead detect the position of the focusing lens 210b via a distance encoder or the like of the known art disposed at the exchangeable lens 200.

It is to be noted that a drive target member other than the focusing lens 210b described above may be disposed in the exchangeable lens 200. For instance, a zoom lens, which is allowed to move along the optical axis of the exchangeable lens 200 (the image forming optical system 210), as is the focusing lens 210b, may be included in the exchangeable lens 200, together with a mechanism (widely known as a power zoom mechanism) that electrically drives the zoom lens. In addition, a blur correction mechanism equipped with a blur correction lens, movable along directions that include directional components (X and Y direction components) perpendicular to the optical axis of the image forming optical system 210, which corrects image blur by driving the blur correction lens, may be disposed in the exchangeable lens 200. Furthermore, an aperture drive mechanism for controlling drive of an aperture member (aperture blades) that can be moved so as to alter the size of an aperture opening through which a subject light flux passes may be disposed in the exchangeable lens 200. The lens control unit 203 in an exchangeable lens that includes such drive target members controls the drive and the position detection executed for the individual drive target members, i.e., the blur correction lens, the aperture member and the zoom lens, via the lens drive unit 212 and the lens position detection unit 213.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

Inside the intermediate adapter 300, a lens 310 is disposed coaxially with an optical axis AX of the image forming optical system 210. The lens 310 is an optical member that directs subject light, having been transmitted through the image forming optical system 210 in the exchangeable lens 200, into the camera body 100. The lens 310 increases the focal length of the image forming optical system 210 by a predetermined rate compared to the focal length achieved without the lens 310. Namely, the intermediate adapter 300 in the embodiment is a member widely known as a tele-conversion lens. It is to be noted that the lens 310 may not be provided in the intermediate adapter 310. The intermediate adapter 300 without the lens 310 functions as a general adapter.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces, as will be explained later.

A display device 111 constituted with an LCD panel or the like is disposed at the rear surface of the camera body 100. The body control unit 103 brings up on display at the display device 111 a subject image (referred to as a live view image) based upon an output from the image sensor 104 or various types of menu screens enabling selection of photographing conditions and the like.

(Description of the Holding Portions)

Figure 3:
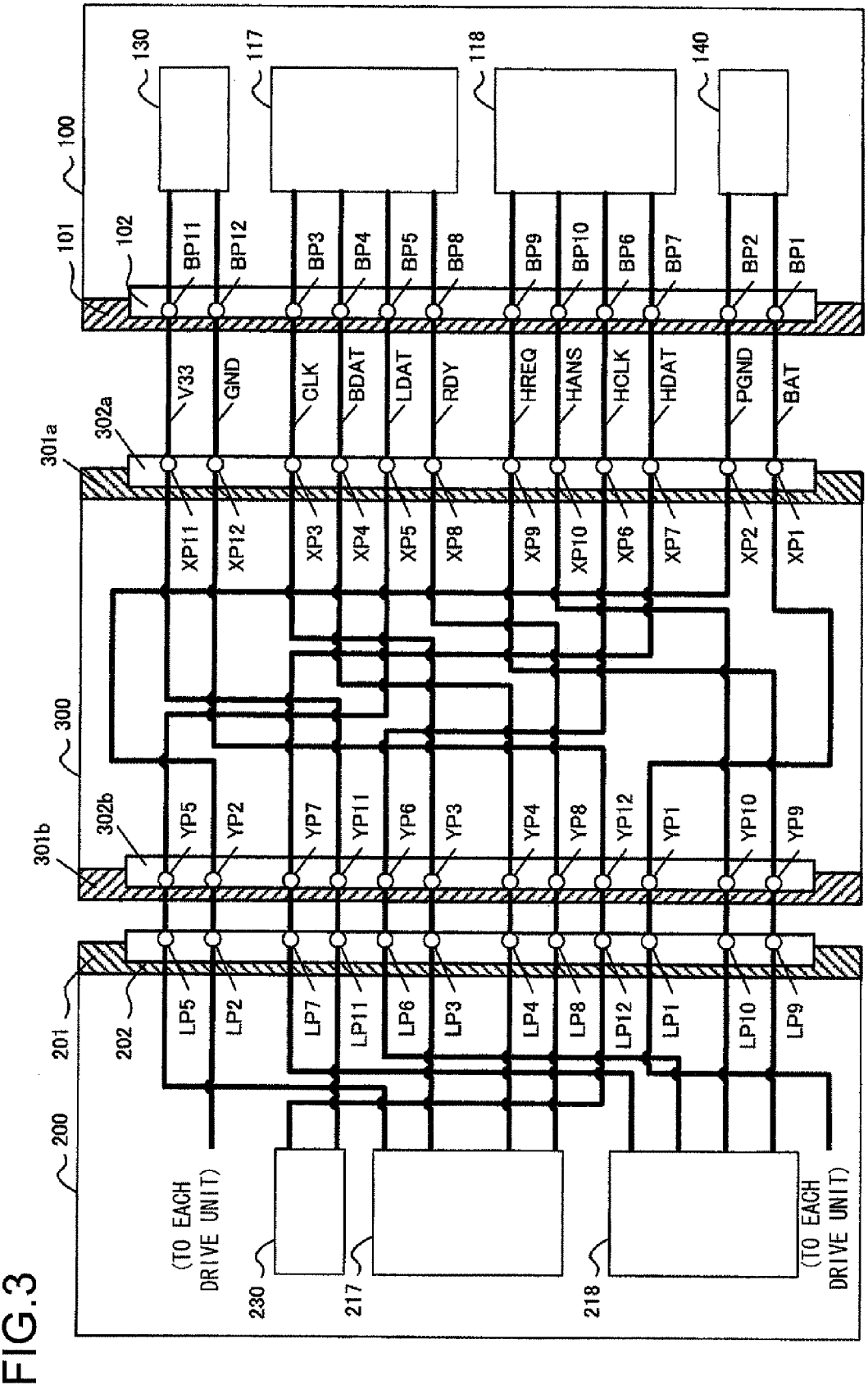

FIG. 3 schematically illustrates a mode of connection adopted in conjunction with the various terminals present at the camera body 100, the exchangeable lens 200 and in between. As FIG. 3 indicates, twelve body connector terminals BP1 through BP12 are present in the holding portion 102 at the camera body 100. In addition, twelve body-side connector terminals XP1 through XP12, each corresponding to one of the twelve body connector terminals BP1 through BP12, are present in the B holding portion 302a at the intermediate adapter 300.

In the L holding portion 302b at the intermediate adapter 300, twelve lens-side connector terminals YP1 through YP12 are present. The twelve lens-side connector terminals YP1 through YP12 in the L holding portion 302b are respectively connected to the twelve body-side connector terminals XP1 through XP12 in the B holding portion 302a. In addition, twelve lens connector terminals LP1 through LP12, each corresponding to one of the twelve lens-side connector terminals YP1 through YP12, are present in the holding portion 202 at the exchangeable lens 200.

The eleventh body connector terminal BP11 and the twelfth body connector terminal BP12 are connected to a first power supply circuit 130 located in the camera body 100. The first power supply circuit 130 provides an operating voltage to the eleventh body connector terminal BP11, via which the operating voltage is supplied to various components disposed in the exchangeable lens 200 except for the lens drive unit 212. In other words, an operating voltage, on which the various components in the exchangeable lens 200 (including the first lens-side communication unit 217 and the second lens-side communication unit 218) except for the lens drive unit 212 operate, is provided via the eleventh body connector terminal BP11 and the eleventh lens connector terminal LP11. While a specific range (e.g., a voltage range from 3 to 3.99 v) defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11. Namely, the twelfth body connector terminal BP12 and the twelfth lens connector terminal LP12 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the twelfth lens connector terminal LP12 will be referred to as a signal line GND. The eleventh lens connector terminal LP11, the twelfth lens connector terminal LP12, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and BP8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK in the following description. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line HCLK and the signal line formed with the seventh body connector terminal BP7 and the seventh lens connector terminal LP7 will be referred to as a signal line HDAT.

The first body connector terminal BP1 and the second body connector terminal BP2 are connected to a second power supply circuit 140 located in the camera body 100. The second power supply circuit 140 provides a drive voltage, to be used to drive the lens drive unit 212, to the first body connector terminal BP1. In other words, the drive voltage for the lens drive unit 212 is supplied via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be provided to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2 is a ground terminal that corresponds to the drive voltage provided to the first body connector terminal 101. Namely, the second body connector terminal BP2 and the second lens connector terminal LP2 are ground terminals that correspond to the drive voltage.

In the following description, the signal line formed with the first body connector terminal BP1 and the first lens connector terminal LP1 will be referred to as a signal line BAT. The signal line formed with the second body connector terminal BP2 and the second lens connector terminal LP2 will be referred to as a signal line PGND. The first body connector terminal BP1, the first lens connector terminal LP1, the second body connector terminal BP2 and the second lens connector terminal LP2 are power supply system terminals used to provide power from the camera body 100 to the exchangeable lens 200.

It is to be noted that as the varying ranges assumed for the voltage value (current value) indicating the level of voltage provided via the first body connector terminal BP1 and the first lens connector terminal LP1 and for the voltage value (current value) indicating the level of voltage provided via the eleventh body connector terminal BP11 and the eleventh lens connector terminal LP11 clearly indicate, the difference between the maximum value and the minimum value taken for the electric current flowing through the second body connector terminal BP2 and the second lens connector terminal LP2, i.e., through the ground terminals corresponding to the voltage provided through the connector terminals BP1 and LP1, is greater than the difference between the maximum value and the minimum value taken for the electric current flowing through the twelfth body connector terminal BPI2 and the twelfth lens connector terminal LP12, i.e., the ground terminals corresponding to the voltage provided through the connector terminals BP11 and LP11. A greater difference is assumed between the maximum value and the minimum value taken for the electric current flowing through the connector terminals BP2 and LP2, since greater power is used in the lens drive unit 212 equipped with a drive system such as an actuator, compared to the power used in the electronic circuits, e.g., the lens control unit 203, in the exchangeable lens 200 and also, the lens drive unit 212 does not use any power at all if it does not need to drive the focusing lens 210b.

Figure 4A:
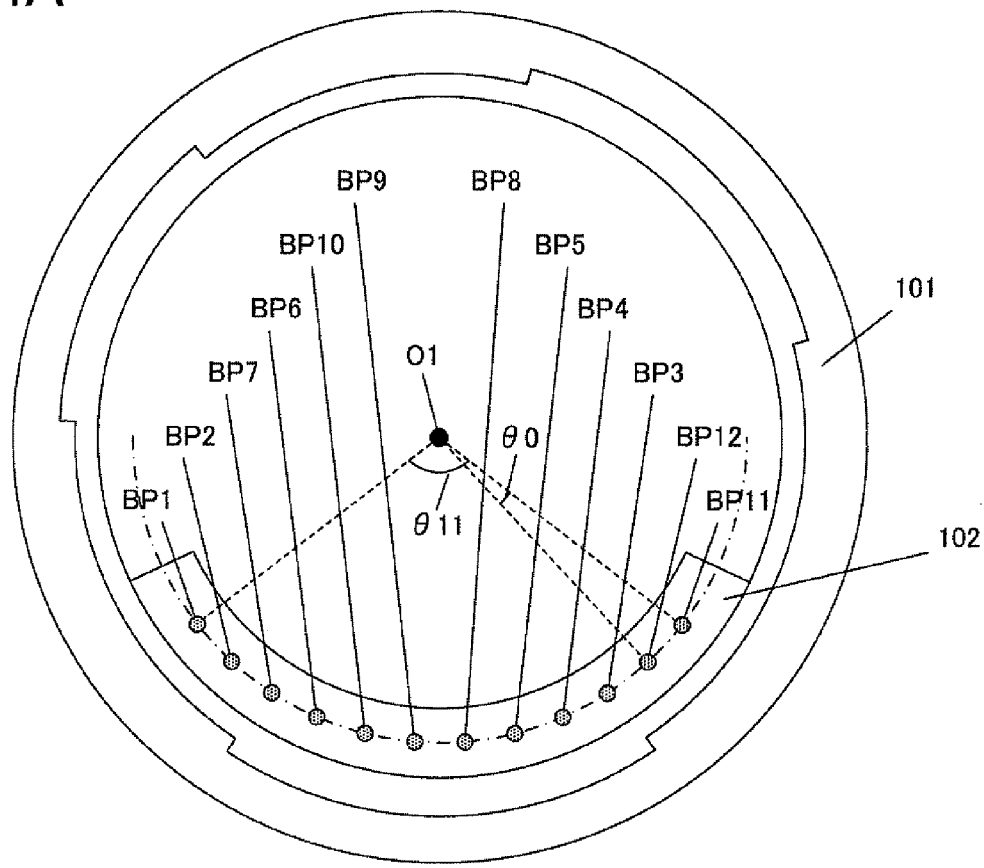
FIGS. 4A and 4B respectively show a camera body mount unit in a front view and associated holding portion in an enlarged view.
Figure 4B:
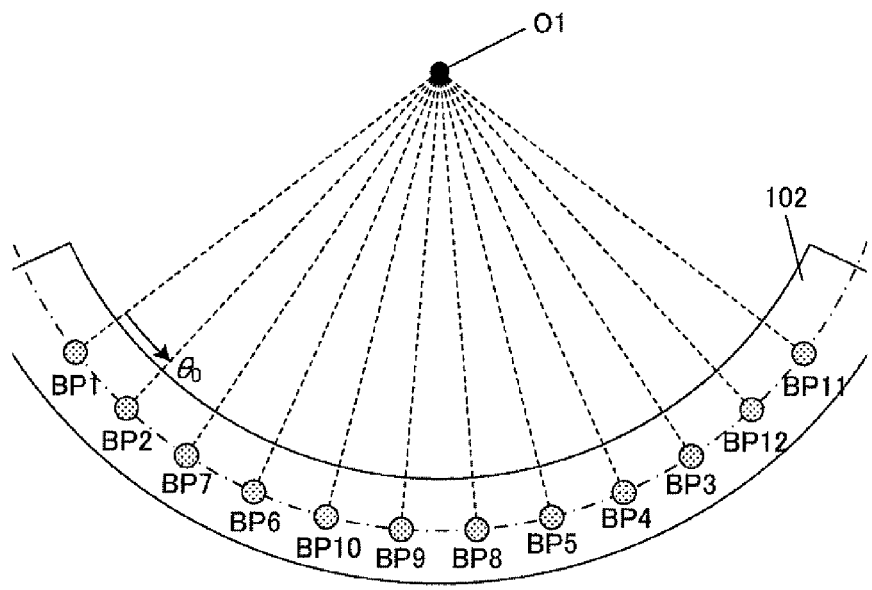
Figure 5A:
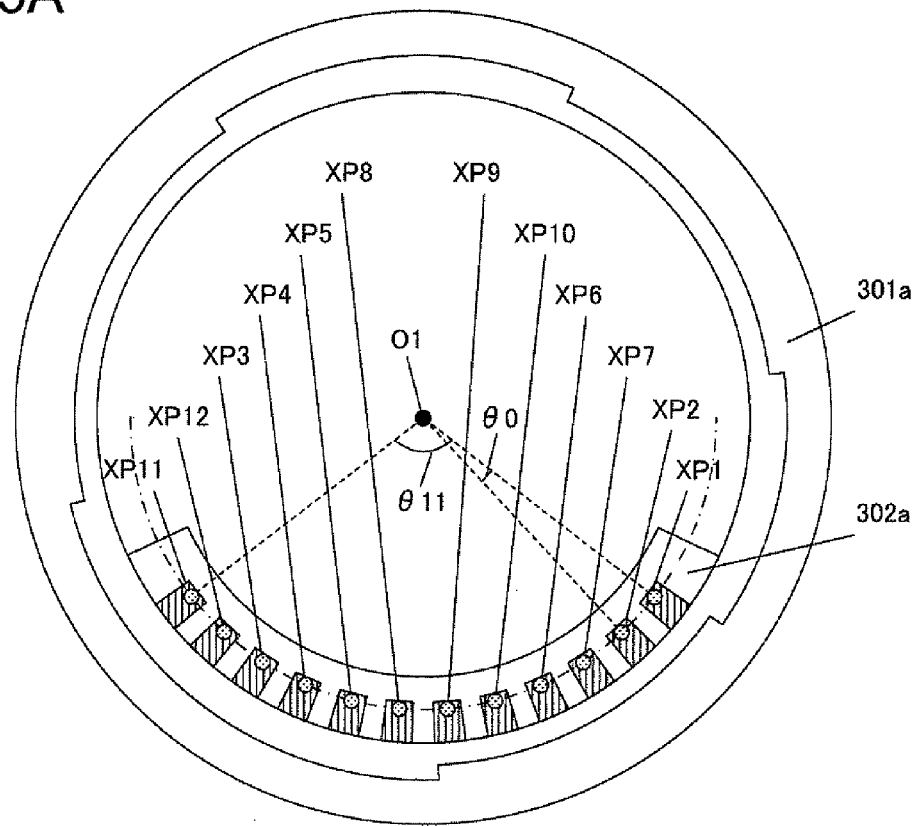
FIGS. 5A and 5B respectively show a B mount unit in a front view and associated holding portion in an enlarged view.
Figure 5B:
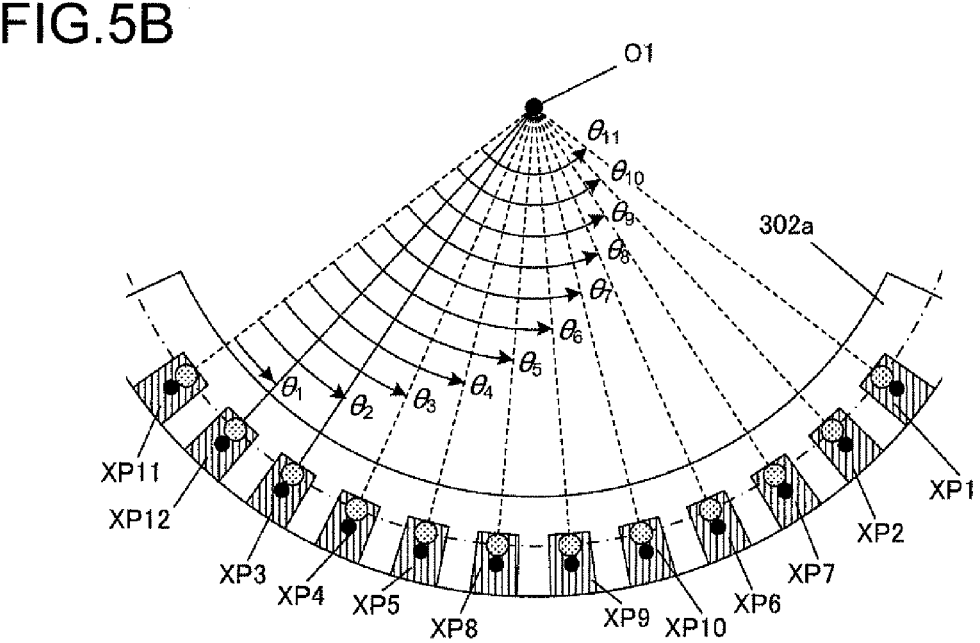

FIGS. 4A and 4B show the camera body mount unit 101 in front views. FIG. 4A shows the camera body mount unit 101 at the camera body 100 viewed from the side where the intermediate adapter 300 is present, whereas FIG. 4B shows the holding portion 102 in FIG. 4A in an enlargement. In addition, FIGS. 5A and 5B each show the B mount unit 301a at the intermediate adapter 300, which corresponds to the camera body mount unit 101 shown in FIGS. 4A and 4B, in a front view, FIG. 5A shows the B mount unit 301a viewed from the side where the camera body 100 is present, whereas FIG. 5B shows the B holding portion 302a in FIG. 5A in an enlargement. The mount units each assume a circular shape and the center of the circle (the position of the optical axis AX) will be referred to as a mount center point O1 in the following description.

As shown in FIG. 4A, the holding portion 102 is disposed at a position inward relative to the mount surface of the camera body mount unit 101 (deeper into the drawing sheet on which FIG. 4A is provided). In addition, the B holding portion 302a is disposed at a position further outward relative to the mount surface of the B mount unit 301a (toward the person viewing FIG. 5A). The holding portion 102 and the B holding portion 302a are connected as the camera body 100 and the intermediate adapter 300 are coupled by placing the mount surface of the camera body mount unit 101 in contact with the mount surface of the B mount unit 301a. Once the holding portions 102 and 302a are thus connected, the twelve body connector terminals BP1 through BP12 and the body-side connector terminals XP1 through XP12 disposed at the two holding portions become connected with each other.

It is to be noted that the one-point chain lines drawn over the twelve body connector terminals BP1 through BP12 and the twelve body-side connector terminals XP1 through XP12 in FIGS. 4A and 4B and FIGS. 5A and 5B indicate a locus through which the twelve body connector terminals BP1 through BP12 move when the camera body 100 is coupled with the intermediate adapter 300. As these one-point chain lines indicate, the twelve body connector terminals BP1 through BP12 move over the circumference of a circle centered on the mount center point O1 when the camera body 100 and the intermediate adapter 300 are coupled with each other. Since this mount structure is of the known art, further explanation is not provided.

As shown in FIG. 4A, the twelve body connector terminals BP1 through BP12 each assume a cylindrical shape and a force imparted from a spring or the like disposed inside the holding portion 102 presses them toward the front of the camera body mount unit 101 (toward the intermediate adapter 300). In addition, as shown in FIG. 5A, the twelve body-side connector terminals XP1 through XP12 each include a substantially rectangular conductor exposed at the surface of the B holding portion 302a. Once the B holding portion 302a is connected with the holding portion 102, the body connector terminals are each pressed against a body-side connector terminal by the force imparted from the spring or the like as described above and thus, electrical continuity is achieved between the body-side connector terminals and the body connector terminals. It is to be noted that the circles drawn over the twelve body-side connector terminals XP1 through XP12 in FIG. 5A and FIG. 5B indicate the positions at which the corresponding body connector terminals are pressed against the body-side connector terminals.

In the following description, the particular area of each of the twelve body-side connector terminals XP1 through XP12 that comes into contact with the corresponding body connector terminal when the camera body 100 and the intermediate adapter 300 are engaged with each other will be referred to as a contact area (an area indicated by each of the circles in FIG. 5A) in the particular body-side connector terminal. In addition, the phrase "when the camera body and the intermediate adapter are engaged with each other" is used to refer to a state in which a voltage is supplied from the eleventh body connector terminal BP11 to the lens connector terminal LP11. It is to be noted that the term "body-side connector terminal" used in the description of the embodiment refers to an entire terminal that includes an electrical wiring (a lead wire, a flexible cable or the like) used to connect the substantially rectangular area (which includes the contact area) exposed at the surface of the B holding portion 302a, indicated as a shaded area in FIG. 5A, with a lens-side connector terminal, as well as the rectangular area itself. In addition, the areas of the body-side connector terminals XP1 through XP12 exposed at the surface of the holding portion 302a, indicated as the shaded areas as explained above, may be referred to as "exposed areas" of the body-side connector terminals XP1 through XP12 in the following description. The expression "the center of a body-side connector terminal" used in the following description refers to the center of the exposed area of the particular body-side connector terminal, indicated as a filled circle in FIG. 5B. It is to be noted that the exposed areas will be described later in detail in reference to FIG. 15.

As shown in FIG. 5A, the twelve body-side connector terminals XP1 through XP12 (the exposed areas of the twelve body-side connector terminals) are set in the B holding portion 302a of the B mount unit 301a forming a circular arc centered on the mount center point O1 and ranging along the B mount unit 301a (along part of the B mount unit 301a assuming a substantially circular shape on the outside).

The twelve body-side connector terminals XP1 through XP12 (their exposed areas) in the embodiment are disposed so that the contact areas of the individual body-side connector terminals are set over equal intervals. An angle θ11 defined by the circular arc, i.e., the angle formed by connecting the mount center point O1, the center of the first body-side connector terminal XP1 (its exposed area), and the center of the eleventh body-side connector terminal XP11 (its exposed area) is approximately 105°. In addition, an angle θ0 defined by the circular arc connecting one contact area to the next contact area is approximately 9.5°. Furthermore, the twelve body-side connector terminals XP1 through XP12 in the embodiment each assume a width of approximately 1.5 mm measured along the direction in which the circular arc ranges. Since the distance between the mount center point O1 and the center of the contact area in each of the body-side connector terminals XP1 through XP12 is approximately 15 mm, the distance between the centers of each two consecutive body-side connector terminals, among the body-side connector terminals XP1 through XP12, measured along the direction in which the circular arc ranges, is approximately 2.5 mm. Furthermore, since the body-side connector terminals XP1 through XP12 achieve a width of approximately 1.5 mm measured along the direction in which the circular arc ranges, the body-side connector terminals XP1 through XP12 are set apart from one another with clearances measuring approximately 1 mm along the direction in which the circular arc ranges.

It is to be noted that the width of the body-side connector terminals XP1 through XP12 (the width of their exposed areas) and the clearance between the individual body-side connector terminals XP1 through XP12 can be altered to optimal values as necessary. For instance, the width of the body-side connector terminals XP1 through XP12 (the width of their exposed areas), measured along the direction in which the circular arc ranges, may be increased or decreased in units of ¹/₁₀ mm (in units of 0.1 mm). In correspondence, the width of the clearance between the body-side connector terminals, measured along the direction in which the circular arc ranges, may be adjusted to an optimal value in units of ¹/₁₀ mm (in units of 0.1 mm, e.g., ±0.2 mm).

Next, in reference to FIG. 5B, the positional relationship among the twelve body-side connector terminals XP1 through XP12 (their exposed areas) will be described. The interior angle θ11, formed by the contact area of the first body-side connector terminal XP1 and the contact area of the eleventh body-side connector terminal XP11 at the mount center point O1, is the largest among interior angles, each formed by the contact areas of any two body-side connector terminals among the twelve body-side connector terminals XP1 through XP12 at the mount center point O1.

An interior angle θ1, formed by the contact area of the eleventh body-side connector terminal XP11 and the contact area of the twelfth body-side connector terminal XP12 at the mount center point O1, is smaller than interior angles θ2 through θ11 each formed by the contact area of a given lens connector terminal among the first body-side connector terminal XP1 through the tenth body-side connector terminal XP10 and the contact area of the eleventh body-side connector terminal XP11 at the mount center point O1. The interior angle θ2 formed by the contact area of the third body-side connector terminal XP3 and the contact area of the eleventh body-side connector terminal XP11 at the mount center point O1, is smaller than the interior angles θ3 through θ11 each formed by the contact area of a given body-side connector terminal among the first body-side connector terminal XP1, the second body-side connector terminal XP2 and the fourth body-side connector terminal XP4 through the tenth body-side connector terminal XP10 and the contact area of the eleventh body-side connector terminal XP11 at the mount center point O.

The interior angle θ3, formed by the contact area of the fourth body-side connector terminal XP4 and the contact area of the eleventh body-side connector terminal XP11 at the mount center point O1, is smaller than the interior angles θ4 through θ11 each formed by the contact area of a given body-side connector terminal among the first body-side connector terminal XP1, the second body-side connector terminal XP2 and the fifth body-side connector terminal XP5 through the tenth body-side connector terminal XP10 and the contact area of the eleventh body-side connector terminal XP11 at the mount center point O1. The interior angle θ4, formed by the contact area of the fifth body-side connector terminal XP5 and the contact area of the eleventh body-side connector terminal XP11 at the mount center point O1, is smaller than the interior angles θ5 through θ11 each formed by the contact area of a given body-side connector terminal among the first body-side connector terminal XP1, the second body-side connector terminal XP2 and the sixth body-side connector terminal XP6 through the tenth body-side connector terminal XP10 and the contact area of the eleventh body-side connector terminal XP11 at the mount center point O1.

The interior angle θ5, formed by the contact area of the eighth body-side connector terminal XP8 and the contact area of the eleventh body-side connector terminal XP11 at the mount center point O1, is smaller than the interior angles θ6 through θ11 each formed by the contact area of a given body-side connector terminal among the first body-side connector terminal XP1, the second body-side connector terminal XP2, the sixth body-side connector terminal XP6, the seventh body-side connector terminal XP7, the ninth body-side connector terminal XP9 and the tenth body-side connector terminal XP10 and the contact area of the eleventh body-side connector terminal XP11 at the mount center point O1. The interior angle θ6, formed by the contact area of the ninth body-side connector terminal XP9 and the contact area of the eleventh body-side connector terminal XP11 at the mount center point O is smaller than the interior angles θ7 through θ11 each formed by the contact area of a given body-side connector terminal among the first body-side connector terminal XP1, the second body-side connector terminal XP2, the sixth body-side connector terminal XP6, the seventh body-side connector terminal XP7 and the tenth body-side connector terminal XP10 and the contact area of the eleventh body-side connector terminal XP11 at the mount center point O1.

The interior angle θ7, formed by the contact area of the tenth body-side connector terminal XP10 and the contact area of the eleventh body-side connector terminal XP11 at the mount center point O1, is smaller than the interior angles θ8 through θ11 each formed by the contact area of a given body-side connector terminal among the first body-side connector terminal XP1, the second body-side connector terminal XP2, the sixth body-side connector terminal XP6 and the seventh body-side connector terminal XP7 and the contact area of the eleventh body-side connector terminal XP11 at the mount center point O1. The interior angle θ8, formed by the contact area of the sixth body-side connector terminal XP6 and the contact area of the eleventh body-side connector terminal XP11 at the mount center point O1, is smaller than the interior angles θ9 through θ11 each formed by the contact area of a given body-side connector terminal among the first body-side connector terminal XP1, the second body-side connector terminal XP2 and the seventh body-side connector terminal XP7 and the contact area of the eleventh body-side connector terminal XP11 at the mount center point O1.

The interior angle θ9, formed by the contact area of the seventh body-side connector terminal XP7 and the contact area of the eleventh body-side connector terminal XP11 at the mount center point O1, is smaller than the interior angles θ10 and θ11 each formed by the contact area of either the first body-side connector terminal XP1 or the second body-side connector terminal XP2 and the contact area of the eleventh body-side connector terminal XP11 at the mount center point O1. The interior angle θ10, formed by the contact area of the second body-side connector terminal XP2 and the contact area of the eleventh body-side connector terminal XP11 at the mount center point O1, is smaller than the interior angle θ11 formed by the contact area of the first body-side connector terminal XP1 and the contact area of the eleventh body-side connector terminal XP11 at the mount center point O1.

The twelve body-side connector terminals XP1 through XP12 (their exposed areas) are disposed at the B holding portion 302a so as to achieve the positional relationship described above. It is to be noted that the second body-side connector terminal XP2 and the twelfth body-side connector terminal XP12, used as ground terminals in conjunction with the first body-side connector terminal XP1 and the eleventh body-side connector terminal XP11 in the power supply systems, through which source voltages (the operating voltage and the drive voltage described earlier) are provided, are set between the first body-side connector terminal XP1 and the third body-side connector terminal XP3 through the tenth body-side connector terminal XP10, i.e., the terminals in the communication system (the communication system terminals), and between the eleventh body-side connector terminal XP11 and the communication system terminals, so as to minimize the extent to which the communication system terminals (signal lines) are affected by the power supply system terminals (signal lines).

The signal lines through which the source voltages are supplied to the exchangeable lens 200 (the signal lines running through the first body-side connector terminal XP1 and the eleventh body-side connector terminal XP11) are each bound to manifest a significant voltage change as the load at the source voltage recipient fluctuates. Such a significant voltage change may adversely affect the communication system signal lines. This adverse effect is minimized in the embodiment by disposing the ground terminals (the second body-side connector terminal XP2 and the twelfth body-side connector terminal XP12), at which voltages tend to remain stable compared to the power supply terminals (the first body-side connector terminal XP1 and the eleventh body-side connector terminal XP11), between the communication system terminals (the third body-side connector terminal XP3 through the tenth body-side connector terminal XP10) and the power supply terminals (the first body-side connector terminal XP1 and the eleventh body-side connector terminal XP11).

While the group of body-side connector terminals connected to the first lens-side communication unit 217, i.e., the third body-side connector terminal XP3, the fourth body-side connector terminal XP4, the fifth body-side connector terminal XP5 and the eighth body-side connector terminal XP8, is disposed next to the group of body-side connector terminals connected to the second lens-side communication unit 218, i.e., the ninth body-side connector terminal XP9, the tenth body-side connector terminal XP10, the sixth body-side connector terminal XP6 and the seventh body-side connector terminal XP7, none of the third body-side connector terminal XP3, the fourth body-side connector terminal XP4 and the fifth body-side connector terminal XP5, connected to the first lens-side communication unit 217, and the sixth body-side connector terminal XP6 and the seventh body-side connector terminal XP7, connected to the second lens-side communication unit 218, occupies a position next to a terminal connected to a different (other) communication unit (217 or 218). In other words, the eighth body-side connector terminal XP8, the ninth body-side connector terminal XP9 and the tenth body-side connector terminal XP10 are disposed in close proximity to each other, each occupying a position close to a terminal connected to the different (other) communication unit. This positional arrangement is adopted since signals that are not synchronous with a clock signal are transmitted through the eighth body-side connector terminal XP8, the ninth body-side connector terminal XP9 and the tenth body-side connector terminal XP10, as will be described in detail later. A signal that is not synchronous with a clock signal in this context refers to a signal that manifests less change relative to the clock signal or a signal synchronous with the clock signal, e.g., a signal manifesting a status change of approximately 1 kHz to several kHz per unit time. Under normal circumstances, a clock signal and a signal synchronous with a clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals, through which a clock signal or a signal synchronous with a clock signal is transmitted, away from any terminal connected to the different (other) communication unit, so as to minimize the adverse effect on communication. In the embodiment, such a positional arrangement is achieved by disposing the group of terminals (the eighth body-side connector terminal XP8, the ninth body-side connector terminal XP9 and the tenth body-side connector terminal XP10), through which signals asynchronous with a clock signal are transmitted, between the group of terminals (the third body-side connector terminal XP3, the fourth body-side connector terminal XP4 and the fifth body-side connector terminal XP5) through which a clock signal and signals synchronous with the clock signal are transmitted in the first lens-side communication unit 217 and the group of terminals (the sixth body-side connector terminal XP6 and the seventh body-side connector terminal XP7) through which a clock signal and a signal synchronous with the clock signal are transmitted in the second lens-side communication unit 218.

The ninth body-side connector terminal XP9, the tenth body-side connector terminal XP10, the sixth body-side connector terminal XP6 and the seventh body-side connector terminal XP7, less affected by noise, are disposed further toward the second power supply circuit 140, whereas the third body-side connector terminal XP3, the fourth body-side connector terminal XP4, the fifth body-side connector terminal XP5 and the eighth body-side connector terminal XP8 are disposed further toward the first power supply circuit 130. The level of power consumption in the lens drive unit 212, to which power is supplied from the second power supply circuit 140, changes greatly depending upon whether or not the lens drive unit 212 is engaged in drive of the focusing lens 210b. This means that the level of electric current flowing through the second body-side connector terminal XP2 tends to fluctuate greatly and such a change in the electric current is bound to affect any communication system terminals in the vicinity to an extent greater than would a change in the electric current flowing through the twelfth body-side connector terminal XP12. However, communication is carried out via the body-side connector terminals XP9, XP10, XP6 and XP7 over cycles shorter than those of the communication carried out via the body-side connector terminals XP3, XP4, XP5 and XP8, as will be explained in further detail later. Thus, even if a communication failure occurs due to a change in the electric current flowing through the second body-side connector terminal XP2, the communication can be re-executed promptly. The communication is carried out via the body-side connector terminals XP9, XP10, XP6 and XP7 over cycles approximately equal to or less than one tenth of the cycles of the communication carried out via the body-side connector terminals XP3, XP4, XP5 and XP8. As will be described in detail later, the communication through the body-side connector terminals XP9, XP10, XP6 and XP7 is carried out over 1 ms cycles and the communication through the body-side connector terminals XP3, XP4, XP5 and XP8 is carried out over 16 ms cycles in the embodiment. This means that the body-side connector terminals XP9, XP10, XP6 and XP7 can be disposed next to the second body-side connector terminal XP2 without subjecting them to any significant adverse effect of noise, to which the body-side connector terminals XP3, XP4, XP5 and XP8 would be subjected if they were disposed next to the second body-side connector terminal XP2.

In addition, the second body-side connector terminal XP2 is disposed next to the seventh body-side connector terminal XP7, which assures a higher level of noise tolerance compared to the sixth body-side connector terminal XP6. As will be described in detail later, a clock signal and a data signal synchronous with the clock signal are respectively transmitted through the sixth body-side connector terminal XP6 and the seventh body-side connector terminal XP7. If the leading edge or the trailing edge of the clock signal becomes indefinite due to noise, accurate synchronization will not be achieved on the reception side. The signal level of the data signal is sampled with the timing of the leading edge or the trailing edge of the clock signal. In other words, the data signal only needs to assure a clear signal level with the timing of the leading edge or the trailing edge of the clock signal, and thus, the noise tolerance of the data signal is considered higher than that of the clock signal.

It is to be noted that the positional arrangement with which the twelve body connector terminals BP1 through BP12 are disposed in the holding portion 102 at the camera body 100, as shown in FIGS. 4A and 4B, is similar to the positional arrangement adopted for the twelve body-side connector terminals XP1 through XP12 at the intermediate adapter 300, and for this reason, a repeated explanation is not provided. It is also to be noted that the camera body mount unit 101 adopts a mount structure widely known as a bayonet mount system, whereby it is positioned so as to face opposite the B mount unit 301*a* of the intermediate adapter 300 and is then rotated relative to the B mount unit 301*a* until it becomes engaged with the B mount unit 301*a*, as FIGS. 1, 4A and 4B, 5A and 5B clearly illustrate. For this reason, the body connector terminals BP1 through BP12 are disposed side-by-side along a direction opposite from the direction in which the body-side connector terminals XP1 through XP12 are disposed side-by-side, as shown in FIGS. 4A and 5A. For instance, while the eleventh body-side connector terminal XP11 is disposed at the left end and the first body-side connector terminal XP1 is disposed at the right end in FIG. 5A, the eleventh body connector terminal BP11 is disposed at the right end and the first body connector terminal 13P1 is disposed at the left end in FIG. 4A.

Figure 6:
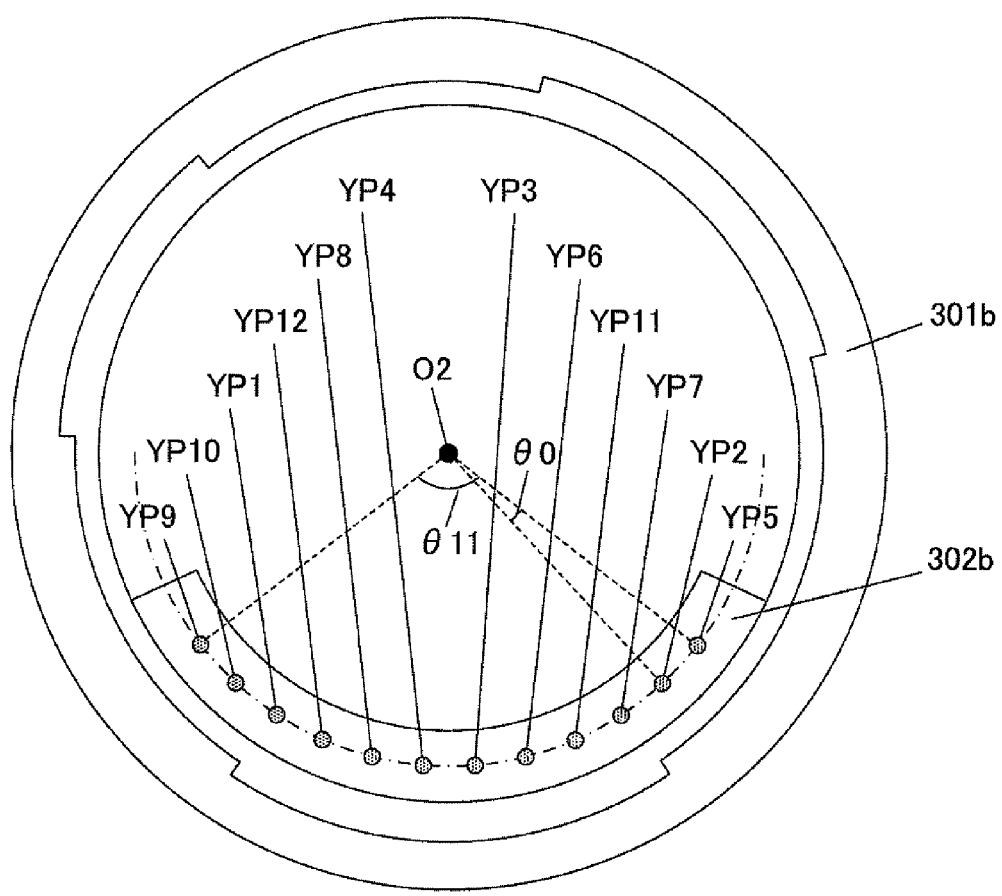
FIG. 6 is a front view of an L mount unit.

FIG. 6 shows the L mount unit 301*b* at the intermediate adapter 300 in a front view taken from the side where the exchangeable lens 200 is present. The L mount unit 301*b* adopts a structure similar to that of the camera body mount unit 101 at the camera body 100 described in reference to FIGS. 4A and 4B. Namely, the L mount unit 301*b* has a circular section, with the L holding portion 302*b* disposed at a position at a greater depth relative to the mounting surface (further into the drawing sheet on which FIG. 6 is presented). While the L holding portion 302*b* is similar to the holding portion 102 at the camera body 100, in that twelve connector terminals are held therein, the twelve lens-side connector terminals YP1 through YP12 are disposed in the L holding portion 302*b* with a positional arrangement different from that of the twelve body connector terminals BP1 through BP12.

As the schematic illustration in FIG. 3 indicates, the wirings extending from the body-side connector terminals XP1 through XP12 are rearranged in the intermediate adapter 300 before they are connected with the lens-side connector terminals YP1 through YP12 disposed in the L holding portion 302*b*. For instance, while the first body connector terminal BP1 is disposed at the left end in FIGS. 4A and 4B, the ninth lens-side connector terminal YP9 is disposed at the left end in FIG. 6. The ninth lens-side connector terminal YP9 is electrically connected to the ninth body connector terminal BP9.

It is to be noted that since the L mount unit 301*b* is structurally similar to the camera body mount unit 101 except that the lens-side connector terminals are disposed in the L mount unit 301*b* with a different positional arrangement, a further explanation pertaining to the structure of the L mount unit 301*b* is not provided.

Figure 7:
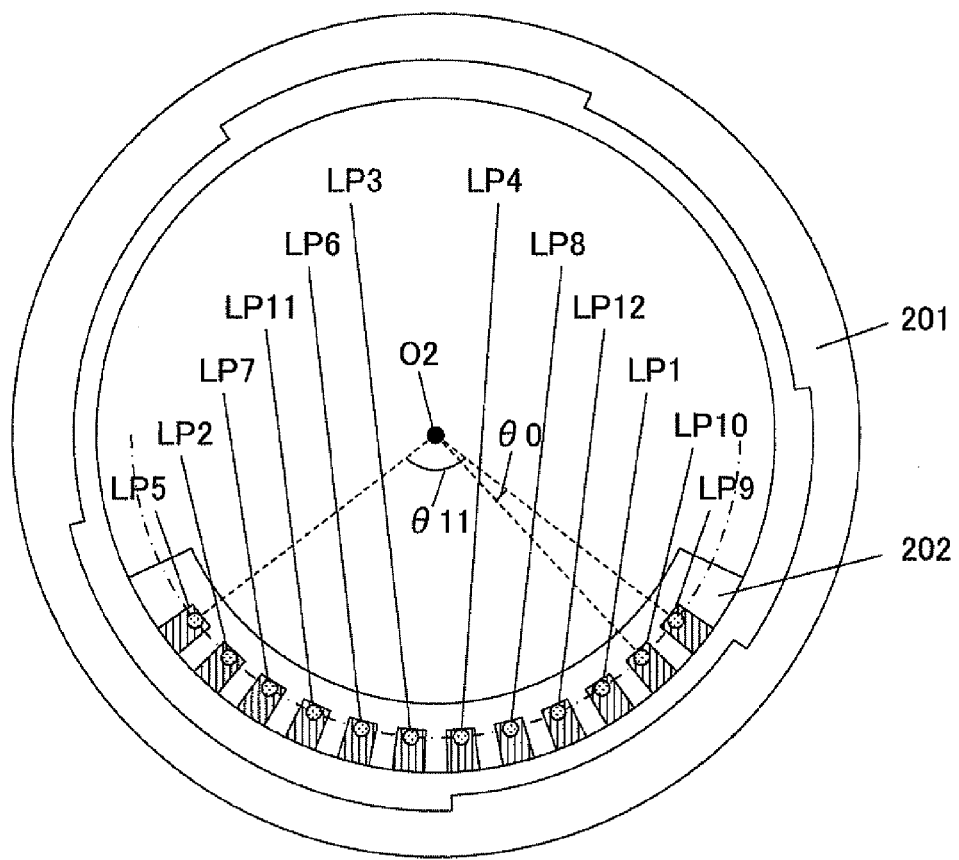
FIG. 7 is a front view of a camera lens mount unit.

FIG. 7 shows the camera lens mount unit 201 at the exchangeable lens 200 in a front view taken from the side where the intermediate adapter 300 is present. The camera lens mount unit 201 adopts a structure similar to that of the B mount unit 301*a* at the intermediate adapter 300 described in reference to FIGS. 5A and 5B. Namely, the camera lens mount unit 201 has a circular section, with the holding portion 202 projecting further outward relative to the mounting surface (toward the viewer of the drawing sheet on which FIG. 7 is presented). While the holding portion 202 is similar to the B holding portion 302*a* at the intermediate adapter 300, in that twelve connector terminals LP1 through LP12 are held therein, the twelve lens connector terminals LP1 through LP12 are disposed in the holding portion 202 with a positional arrangement different from that of the twelve body-side connector terminals XP1 through XP12, in much the same way as the different positional arrangement adopted in the L holding portion 302*b* described above. In other words, the positional relationship among the twelve lens-side connector terminals YP1 through YP12 relative to a mount center point O2 of the L mount unit 301*b* is different from the positional relationship among the twelve body-side connector terminals XP1 through XP12 relative to the mount center point O1 of the B mount unit 301*a*. It is to be noted that since the camera lens mount unit 201 is structurally similar to the B mount unit 301*a* except that the lens connector terminals are disposed in the camera lens mount unit 201 with a different positional arrangement, a further explanation pertaining to the structure of the camera lens mount unit 201 is not provided.

The twelve lens-side connector terminals YP1 through YP12 each assume a cylindrical shape and a force imparted from a spring or the like disposed inside the L holding portion 302*b* presses them toward the front of the L mount unit 301*b* (toward the exchangeable lens 200). In addition, as shown in FIG. 7, the twelve lens connector terminals LP1 through LP12 each include a substantially rectangular conductor exposed at the surface of the holding portion 202. Once the L holding portion 302*b* is connected with the holding portion 202, the lens-side connector terminals are each pressed against a lens connector terminal by the force imparted from the spring or the like as described above and thus, electrical continuity is achieved between the lens-side connector terminals and the lens connector terminals. In the following description, the areas where the conductors are exposed at the surface of the holding portion 202, as explained above, may be referred to as "exposed areas" of the lens connector terminals LP1 through LP12.

(Description of Command Data Communication)

The lens control unit 203 concurrently receives control data from the first body-side communication unit 117 and transmits response data to the first body-side communication unit 117 over predetermined first cycles (16 ms cycles in the embodiment) via the third lens connector terminal LP3, the fourth lens connector terminal LP4, the fifth lens connector terminal LP5 and the eighth lens connector terminal LP8, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117, respectively under control executed by the lens control unit 203 and the body control unit 103, will be referred to as "command data communication".

FIG. 8 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication-enabled state. If the first lens-side communication unit 217 is in a communication disabled state, the lens control unit 203 and the first lens-side communication unit 217 output an H (high) level signal through the eighth lens connector terminal LP8. In other words, the signal level at the signal line RDY is set to H. Until the signal line RDY holding H level shifts to L level, the body control unit 103 and the first body-side communication unit 117 do not start communication. They do not execute the next phase of processing for any communication in progress, either.

Upon verifying that the signal level at the signal line RDY is L (low) level, the body control unit 103 and the first body-side communication unit 117 output a clock signal 401 through the third body connector terminal BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the fourth body connector terminal BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the fifth lens connector terminal LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of the completion of the first control processing 404. In response to this notification, the first lens-side communication unit 217 outputs an L-level signal via the eighth lens connector terminal LP8. In other words, the signal level at the signal line RDY is set to L (T3). In response to the signal level shift, the body control unit 103 and the first body-side communication unit 117 output a clock signal 405 through the third body connector terminal BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the fourth body connector terminal BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the fifth lens connector terminal LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 having been received may be a request for specific data available on the exchangeable lens side. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. A signal carrying the specific data generated through the first control processing 404 is output as the lens-side data packet signal 407 to the body side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing, such as that described above, by using the checksum data contained in the body-side data packet signal 406, as the second control processing 408.

In another scenario, the body-side command packet signal 402 may be a drive instruction for driving a lens-side drive target member. For instance, the command packet signal 402 may be a drive instruction for the focusing lens 210*b* and the body-side data packet signal 406 may indicate a drive quantity, i.e., the extent to which the focusing lens 210*b* needs to be driven. In this case, the lens control unit 203 analyzes the contents of the command packet signal 402 and generates an OK signal acknowledging that the contents have been understood in the first control processing 404. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of the completion of the second control processing 408. By issuing this notification, the lens control unit 203 prompts the first lens-side communication unit 217 to output an L-level signal through the eighth lens connector terminal LP8. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the lens drive unit 212 in execution of processing through which the focusing lens 210b is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217 through the single session of command data communication. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The eighth lens connector terminal LP8 and the eighth body connector terminal BP8 used for command data communication are contact points via which an asynchronous signal (a signal indicating H (high) level or L (low) level read at the signal line RDY) that is not synchronous with any clock signal is transmitted.

(Description of Hotline Communication)

The lens control unit 203 transmits lens position data to the second body-side communication unit 118 via the ninth lens connector terminal LP9, the tenth lens connector terminal LP10, the sixth lens connector terminal LP6 and the seventh lens connector terminal LP7, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118 respectively under control executed by the lens control unit 203 and the body control unit 103, will be referred to as "hotline communication".

Figure 9A:
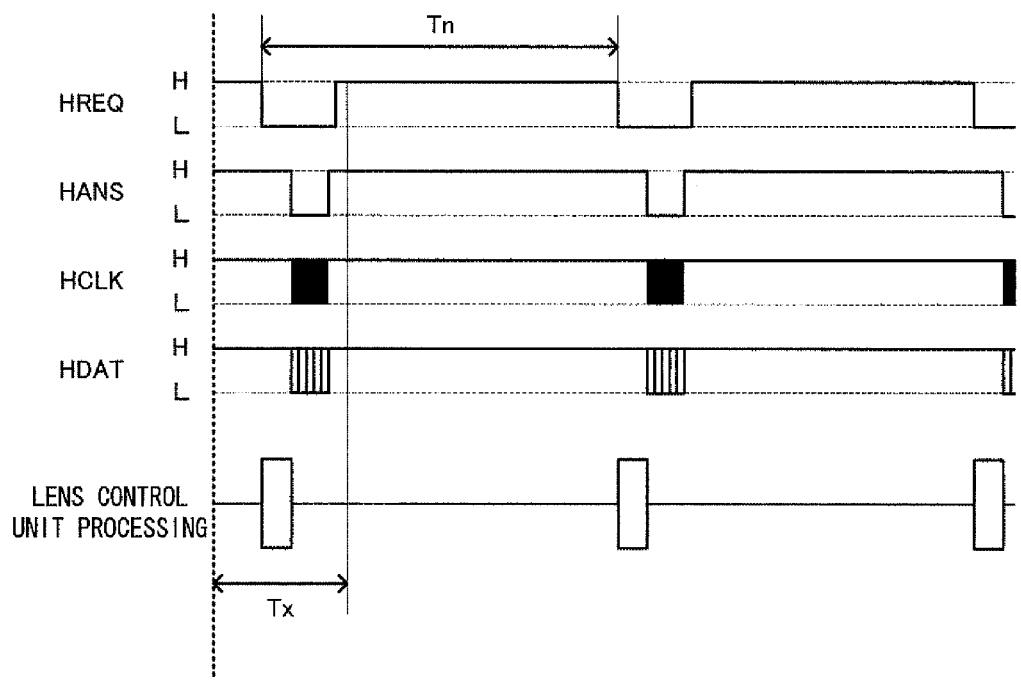
FIGS. 9A and 9B are timing charts indicating the timing with which hotline communication may be executed.
Figure 9B:
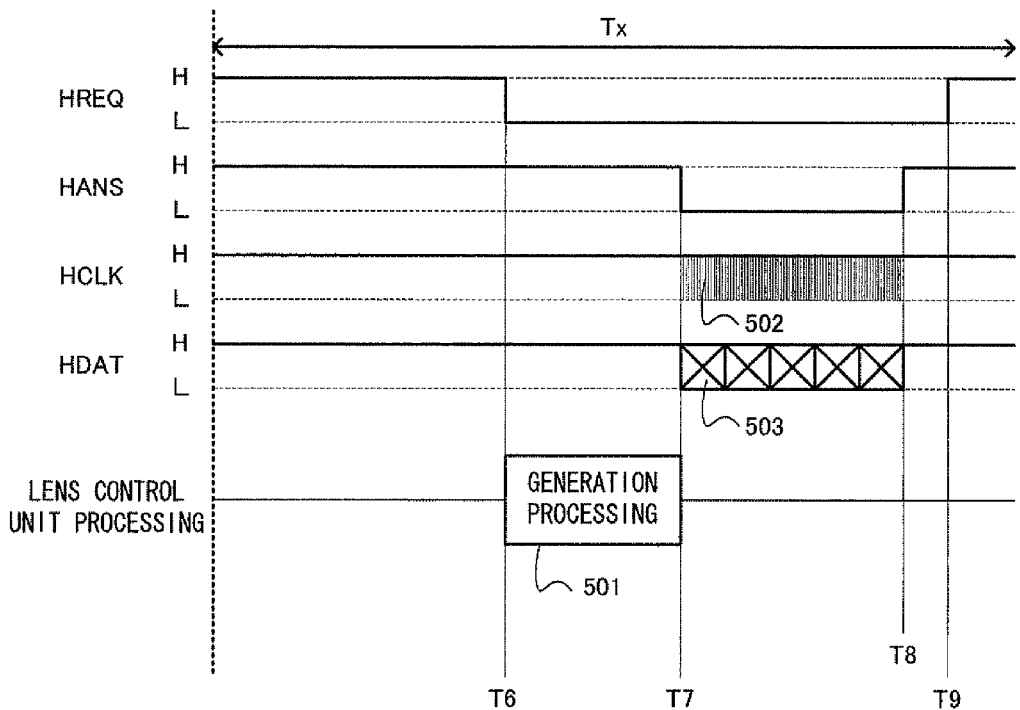

FIGS. 9A and 9B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 9A indicates that hotline communication is repeatedly executed over predetermined cycles Tn. FIG. 9B is an enlarged view of a given communication period Tx elapsing as hotline communication is repeatedly executed. The following is a description of the procedure through which hotline communication is carried out, given in reference to the timing chart in FIG. 9B.

The body control unit 103 and the second body-side communication unit 118 first output an L-level signal through the ninth body connector terminal BP9 at a hotline communication start (T6). In other words, the signal level at the signal line HREQ is set to L. The second lens-side communication unit 218 notifies the lens control unit 203 that the signal has been input to the ninth lens connector terminal LP9. In response to this notification, the lens control unit 203 starts executing data generation processing 501 in order to generate lens position data. In the generation processing 501, the lens control unit 203 engages the lens position detection unit 213 in detection of the position of the focusing lens 210b and generates lens position data indicating the detection results.

Once the lens control unit 203 completes execution of the generation processing 501, the lens control unit 203 and the second lens-side communication unit 218 output an L-level signal through the tenth lens connector terminal LP10 (T7). In other words, the signal level at the signal line HANS is set to L. In response to input of this signal at the tenth body connector terminal BP10, the body control unit 103 and the second body-side communication unit 118 output a clock signal 502 via the sixth body connector terminal BP6. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the seventh lens connector terminal LP7. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the tenth lens connector terminal LP10. In other words, the signal level at the signal line HANS is set to H (T8). In response to input of this signal at the tenth body connector terminal BP10, the second body-side communication unit 118 outputs an H-level signal through the ninth body connector terminal BP9. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The ninth lens connector terminal LP9, the tenth lens connector terminal LP10, the ninth body connector terminal BP9 and the tenth body connector terminal BP10 used in hotline communication are contact points via which asynchronous signals that are not synchronous with any clock signal are transmitted. In other words, the ninth lens connector terminal LP9 and the ninth body connector terminal BP9 are contact points via which an asynchronous signal (indicating H (high) level or L (low) level read at the signal line HREQ) is transmitted. The tenth lens connector terminal LP10 and the tenth body connector terminal BP10 are contact points via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., the first lens-side communication unit 217 or the second lens-side communication unit 218 is engaged in communication with the camera body 100, the other communication unit is also allowed to communicate with the camera body 100.

The camera system achieved in the first embodiment as described above realizes the following advantages.

(1) The intermediate adapter 300 includes the B mount unit 301a at which the camera body 100, having twelve body connector terminals BP1 through BP12, is mounted and the L mount unit 301b at which the exchangeable lens 200 is mounted. In the B holding portion 302a, twelve body-side connector terminals XP1 through XP12 (their exposed areas), to be respectively connected to the twelve body connector terminals BP1 through BP12 at the camera body 100, are disposed. The twelve body-side connector terminals XP1 through XP12 (their exposed areas) are disposed so as to achieve the positional relationship indicated in FIGS. 5A and 5B. Through these measures, the two communication systems, independent of each other, are able to engage in communication between the camera body 100 and the intermediate adapter 300 in an optimal manner without adversely affecting each other.

(2) In the L holding portion 302b, twelve lens-side connector terminals YP1 through YP12 (their exposed areas), respectively connected with the twelve body-side connector terminals XP1 through XP12 (their exposed areas), are disposed. These twelve lens-side connector terminals YP1 through YP12 are respectively connected to the lens connector terminals LP1 through LP12 disposed near the camera lens mount unit 201 at the exchangeable lens 200, which is mounted via the L mount unit 301b. Through these connections, the camera body 100 is able to communicate with the exchangeable lens 200 mounted thereat via the intermediate adapter 300.

(3) The positional relationship among the twelve lens-side connector terminals YP1 through YP12 (their exposed areas) relative to the mount center point O2 of the L mount unit 301b is different from the positional relationship among the twelve body-side connector terminals XP1 through XP12 (their exposed areas) relative to the mount center point O1 of the B mount unit 301a. By assuming positional relationships different from each other as described above, communication with lenses adopting different lens terminal positional arrangements is enabled.

(4) The intermediate adapter 300 includes the lens 310 through which the subject light, having been transmitted through the image forming optical system 210 in the exchangeable lens 200, is directed into the camera body 100. This means that via the intermediate adapter 300 adopting an optimal structural configuration, the optical characteristics of the photographic optical system can be altered without having to modify the exchangeable lens 200.

(Second Embodiment)

Figure 10:
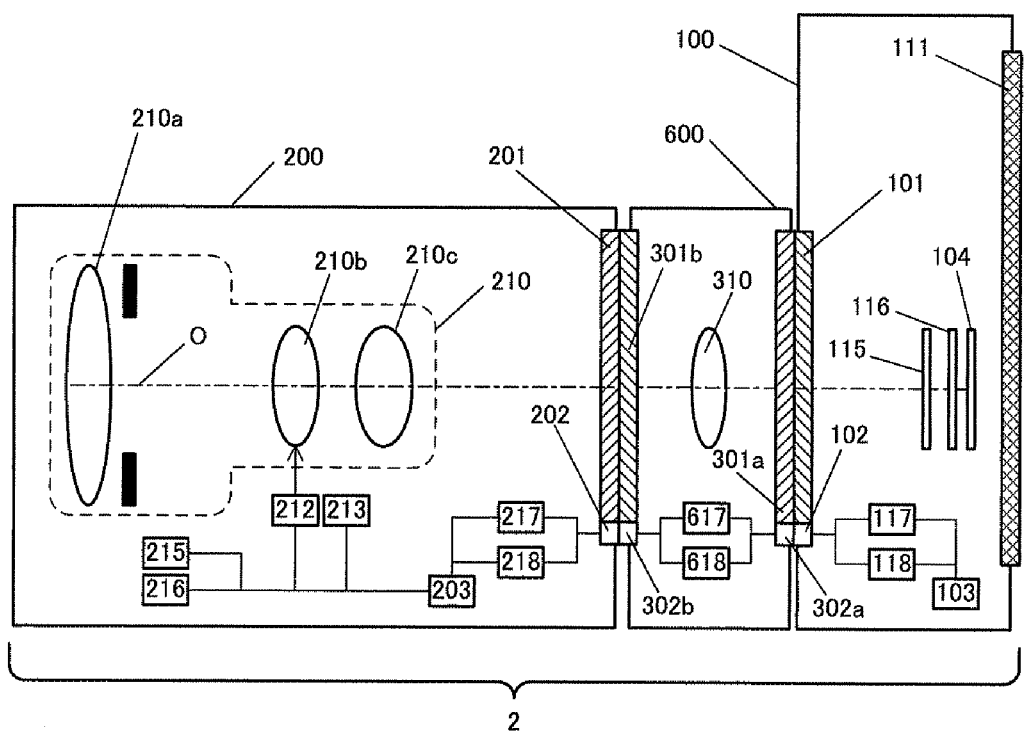
FIG. 10 is a sectional view of the camera system compatible with exchangeable lenses achieved in a second embodiment of the present invention.

FIG. 10 shows the camera system 2 achieved in the second embodiment of the present invention in a sectional view. This camera system includes an intermediate adapter 600 equipped with a first adapter-side communication unit 617 and a second adapter-side communication unit 618, instead of the intermediate adapter 300 in the camera system 1 achieved in the first embodiment. The following is a description of the intermediate adapter 600. It is to be noted that a description of the camera body 100 and the exchangeable lens 200, which are identical to those in the first embodiment, is not provided.

Figure 11:
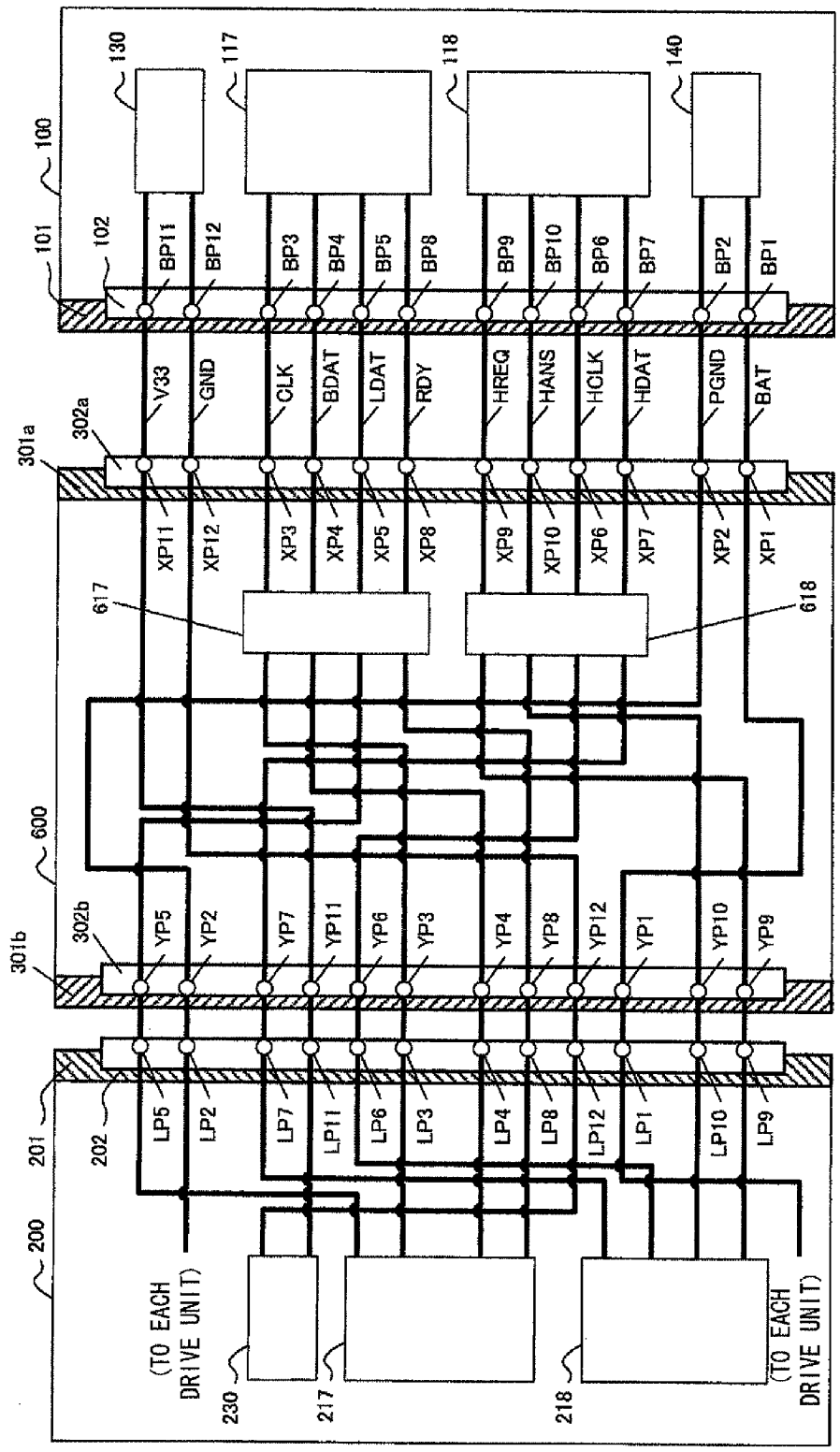

FIG. 11 is a schematic illustration of a mode of connection adopted in conjunction with the various terminals present at the camera body 100, the exchangeable lens 200 and in between. The intermediate adapter 600 achieved in the embodiment includes the first adapter-side communication unit 617 and the second adapter-side communication unit 618. These communication units, wired so as to connect the various terminals at the camera body 100 with the various terminals at the exchangeable lens 200, operate on power provided from the camera body 100.

The first adapter-side communication unit 617 is connected with the third body-side connector terminal XP3, the fourth body-side connector terminal XP4, the fifth body-side connector terminal XP5 and eighth body-side connector terminal XP8 disposed in the B holding portion 302a. Via these four terminals, the first adapter-side communication unit 617 engages in the command data communication explained earlier with the first body-side communication unit 117 at the camera body 100.

The first adapter-side communication unit 617 is further connected with the third lens-side connector terminal YP3, the fourth lens-side connector terminal YP4, the fifth lens-side connector terminal YP5 and the eighth lens-side connector terminal YP8 disposed in the L holding portion 302b. The first adapter-side communication unit 617, having carried command data communication with the first body-side communication unit 117 at the camera body 100, engages in command data communication, as explained earlier, with the first lens-side communication unit 217 at the exchangeable lens 200 via these four terminals based upon the contents of the communication having been carried out with the first body-side communication unit 117.

In other words, the first adapter-side communication unit 617 is engaged in command data communication with the first body-side communication unit 117 in much the same way as the first lens-side communication unit 217 is engaged in command data communication with the first body-side communication unit 117 in the first embodiment, so as to receive data expressing a specific control instruction. Then, the first adapter-side communication unit 217 transmits data, expressing a similar control instruction but different from the data it has received, to the exchangeable lens 200 through command data communication with the first lens-side communication unit 217 executed in much the same way as the command data communication carried out by the first body-side communication unit 117 in the first embodiment. This means that the first adapter-side communication unit 617 functions as an intermediary in command data communication between the camera body 100 and the exchangeable lens 200 by converting a command from the camera body 100 to data in a predetermined format and transmitting the data resulting from the conversion to the exchangeable lens 200.

It is to be noted that an explanation of the second adapter-side communication unit 618, which is similar to the first adapter-side communication unit 617, is not provided. In short, the second adapter-side communication unit 618 functions as an intermediary in hotline communication between the camera body 100 and the exchangeable lens 200 by converting data from the exchangeable lens 200 to data in a predetermined format and transmitting the data resulting from the conversion to the camera body 100.

The camera system achieved in the second embodiment as described above realizes the following advantage.

(1) The first adapter-side communication unit 617 engages in data communication with the first body-side communication unit 117 at the camera body 100 by carrying out command data communication via the four body-side connector terminals XP3, XP4, XP5 and XP8. Upon receiving data expressing a specific control instruction from the camera body 100 through this data communication, the first adapter-side communication unit 617 engages in data communication with the first lens-side communication unit 217 at the exchangeable lens 200 by carrying out command data communication via four lens-side connector terminals YP3, YP4, YP5 and YP8, so as to transmit to the exchangeable lens 200 data that are different from the data it has received but express the same control instruction. Through these measures, an exchangeable lens 200 requiring control data different from the control data originating from the camera body 100 can be utilized in conjunction with the camera body 100.

(Third Embodiment)

The camera system achieved in the third embodiment of the present invention having a configuration similar to that of the camera system in the first embodiment includes body-side connector terminals XP1 through XP12 and lens connector terminals LP1 through LP12 with a profile (at their exposed areas) different from the profile of the body-side connector terminals XP1 through XP12 and the lens connector terminals LP1 through LP12 in the first embodiment. The following is a description of the profile of the body-side connector terminals XP1 through XP12 and the lens connector terminals LP1 through LP12 assumed at their exposed areas in the third embodiment. It is to be noted that in the following description, the same reference numerals are assigned to members similar to those in the first embodiment so as to preclude the necessity for a repeated explanation thereof.

Figure 14A:
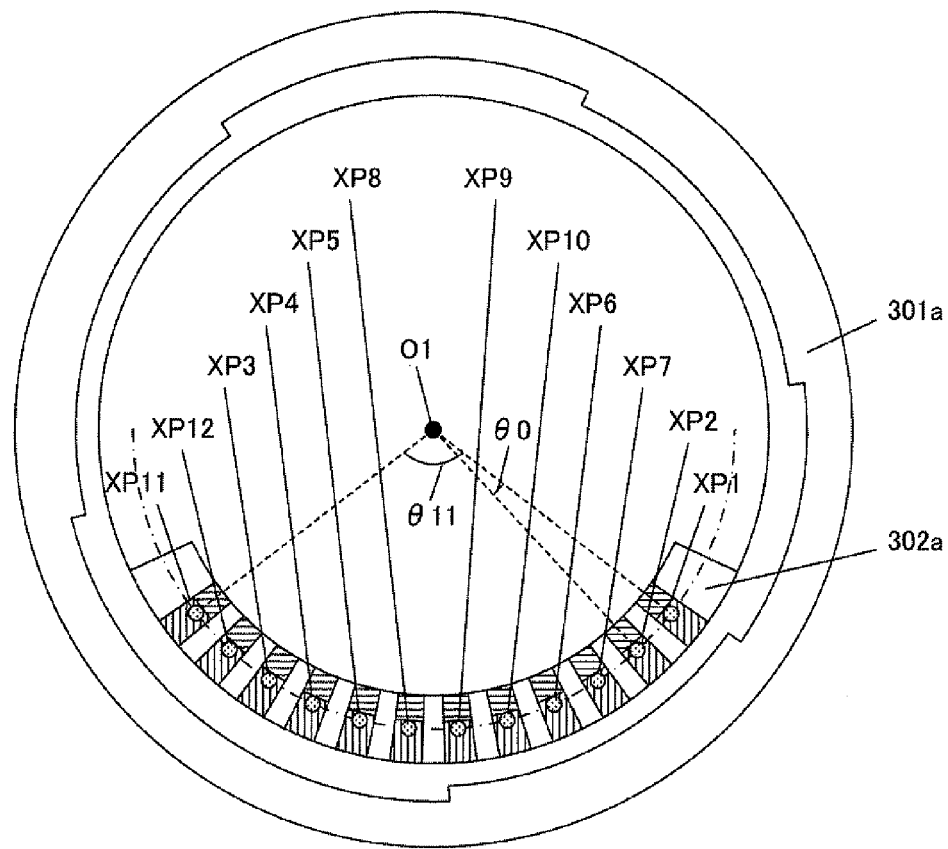
FIGS. 14A and 14B respectively show a B mount unit in a front view and associated holding portion in an enlarged view.
Figure 14B:
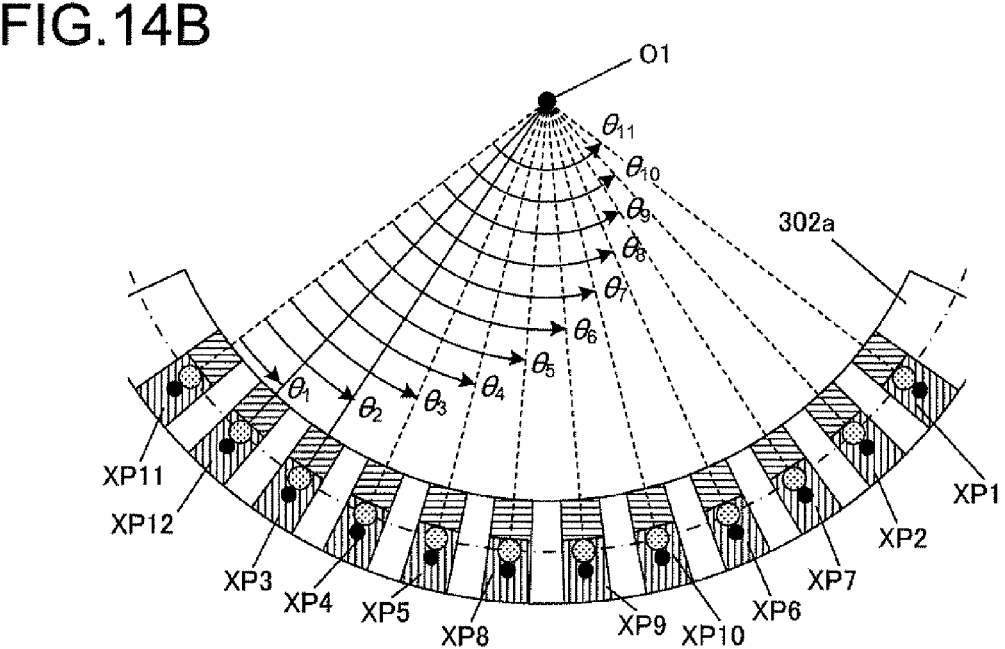

FIGS. 14A and 14B show the B mount unit 301a at the intermediate adapter 300 achieved in the third embodiment in front views. As FIGS. 14A and 14B indicate, twelve body-side connector terminals XP1 through XP12 disposed in the B holding portion 302a at the B mount unit 301a in the embodiment each assume a size large enough to range from the inner circumferential side (the side closer to the mount center point O1) of the B holding portion 302a through the outer circumferential side (the side further away from the mount center point O1) of the B holding portion 302a. However, the size of their exposed areas and the positions of the exposed areas are the same as those of the body-side connector terminals in the first embodiment described in reference to FIGS. 5A and 5B. The following is a description of features unique to the third embodiment, given in reference to a sectional view of the eighth body-side connector terminal XP8.

Figure 15A:
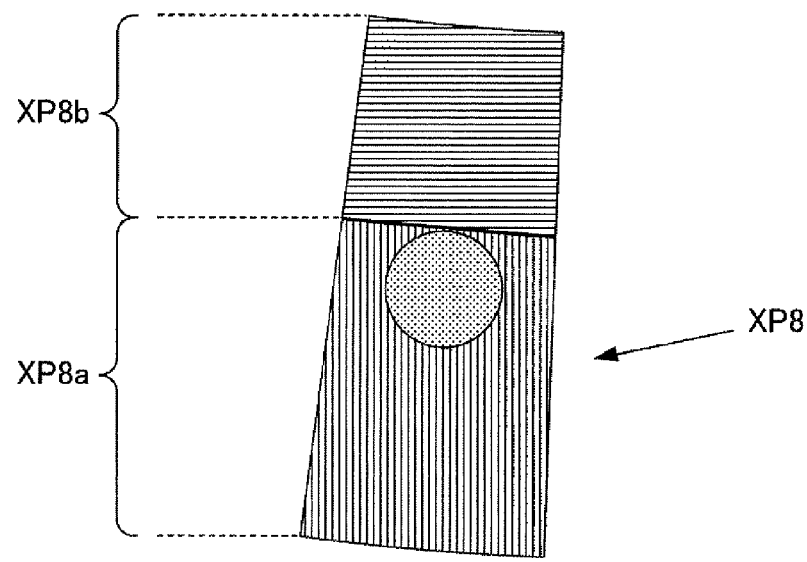
FIGS. 15A and 15B show an eighth body-side connector terminal respectively in a front view and a sectional view.
Figure 15B:
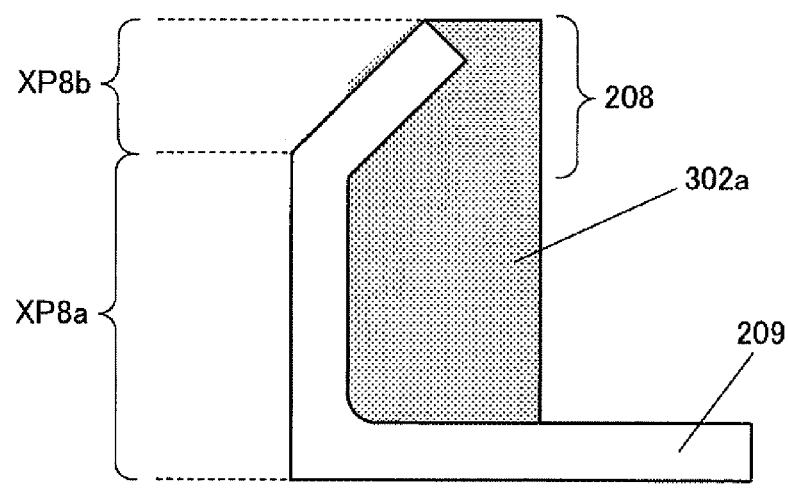

FIG. 15A is an enlarged front view of the eighth body-side connector terminal XP8, whereas FIG. 15B shows the eighth body-side connector terminal XP8 and the B holding portion 302a in a sectional view. As shown in the sectional view presented in FIG. 15B, one end of a metal piece 209 constituting the eighth body-side connector terminal XP8 is placed in a recess 208 formed at the surface of the B holding portion 302a. Namely, the surface of the metal piece 209 includes two different areas, i.e., an exposed area XP8a, which is exposed at the surface of the B holding portion 302a, and a fixing part XP8b at which the metal piece 209 is fixed to the B holding portion 302a. While the exposed area, viewed from the surface as in FIG. 15A, appears to be larger than those shown in FIGS. 5A and 5B, the size of the exposed area XP8a is actually the same as that of the exposed areas in FIGS. 5A and 5B.

While a repeated explanation is not provided, the exposed areas of the remaining eleven body-side connector terminals and the twelve lens connector terminals LP1 through LP12 are identical to the exposed area of the eighth body-side connector terminal XP8 described above. Namely, the size of the exposed areas and the positions of the exposed areas of the remaining eleven body-side connector terminals and the twelve lens connector terminals LP1 through LP12, too, are the same as those of the lens connector terminals shown in FIGS. 5A and 5B, and the area that would appear to have been added on at the surface is accounted for by the fixing part at which each metal piece is fixed to the B holding portion 302a.

It is to be noted that the shape described in reference to FIGS. 14A and 14B and FIGS. 15A and 15B may be adopted only either in the twelve body-side connector terminals XP1 through XP12 or in the twelve lens connector terminals LP1 through LP12. In addition, the twelve body-side connector terminals XP through XP12 do not all need to adopt this shape and instead, one of the twelve body-side connector terminals, e.g., the body-side connector terminal XP1, or two or three body-side connector terminals may assume the alternative shape. This principle is applicable to the lens connector terminals LP1 through LP12, as well. In addition, while the explanation is given above by assuming that the sizes and the positions of the exposed areas are the same as those in the first embodiment described in reference to FIGS. 5A and 5B, exposed areas may be formed to range in sizes and at positions different from those in the first embodiment.

The camera system achieved in the third embodiment as described above realizes advantages similar to those of the first embodiment.

(Fourth Embodiment)

Figure 16:
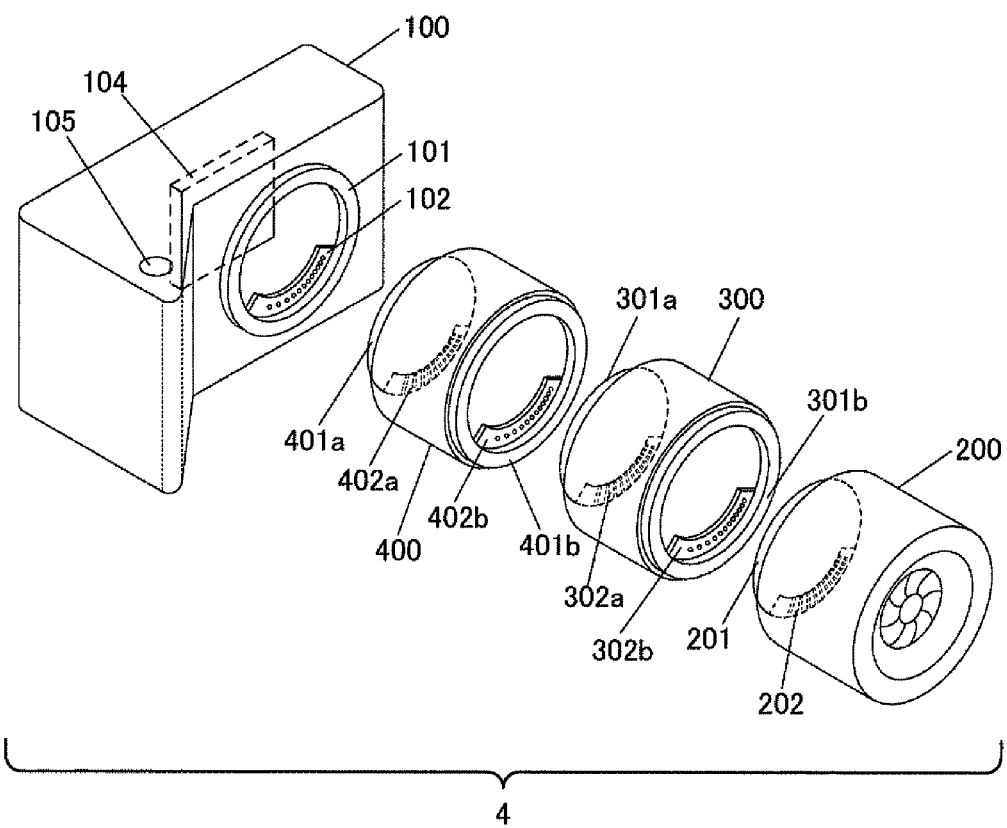
FIG. 16 is a perspective of a camera system compatible with exchangeable lenses achieved by adopting a fourth embodiment of the present invention.

FIG. 16 is a perspective of the camera system achieved in the fourth embodiment of the present invention. A camera system 4 comprises an intermediate adapter 400 mounted at a camera body 100, an intermediate adapter 300 mounted at the intermediate adapter 400 and an exchangeable lens 200 that is mounted at the intermediate adapter 300 as an accessory.

The camera body 100, the exchangeable lens 200 and the intermediate adapter 300 are structurally identical to those of the camera body 100, the exchangeable lens 200 and the intermediate adapter 300 in the first embodiment. In other words, the camera system 4 assumes a structure achieved by replacing the camera body 100 in the camera system 1 in the first embodiment with the camera body 100 and the intermediate adapter 400.

The intermediate adapter 400 includes a first mount unit 401a that fits with the camera body mount unit 101 at the camera body 100 and a second mount unit 401b that fits with the B mount unit 301a at the intermediate adapter 300. A body-side through connector terminal holding portion 402a (hereafter referred to as a BT holding portion 402a), which projects out toward the inner circumferential side of the first mount unit 401a over part of the inner circumference, with twelve body-side through connector terminals held thereat, is disposed in an area near the first mount unit 401a (on the inner circumferential side of the first mount unit 401a). In addition, a lens-side through connector terminal holding portion 402a (hereafter referred to as an LT holding portion 402b), which projects out toward the inner circumferential side of the second mount unit 401b over part of the inner circumference, with twelve lens-side through connector terminals held thereat, is disposed in an area near the second mount unit 401b (on the inner circumferential side of the second mount unit 401b).

As the camera body 100 is engaged with the intermediate adapter 400, the plurality of body connector terminals held at the holding portion 102 become electrically and physically connected to the plurality of body-side through connector terminals held at the BT holding portion 402a. In addition, as the intermediate adapter 300 is engaged with the intermediate adapter 400, the plurality of lens-side through connector terminals held at the LT holding portion 402b become electrically and physically connected to the plurality of body-side connector terminals held at the B holding portion 302a.

Figure 17:
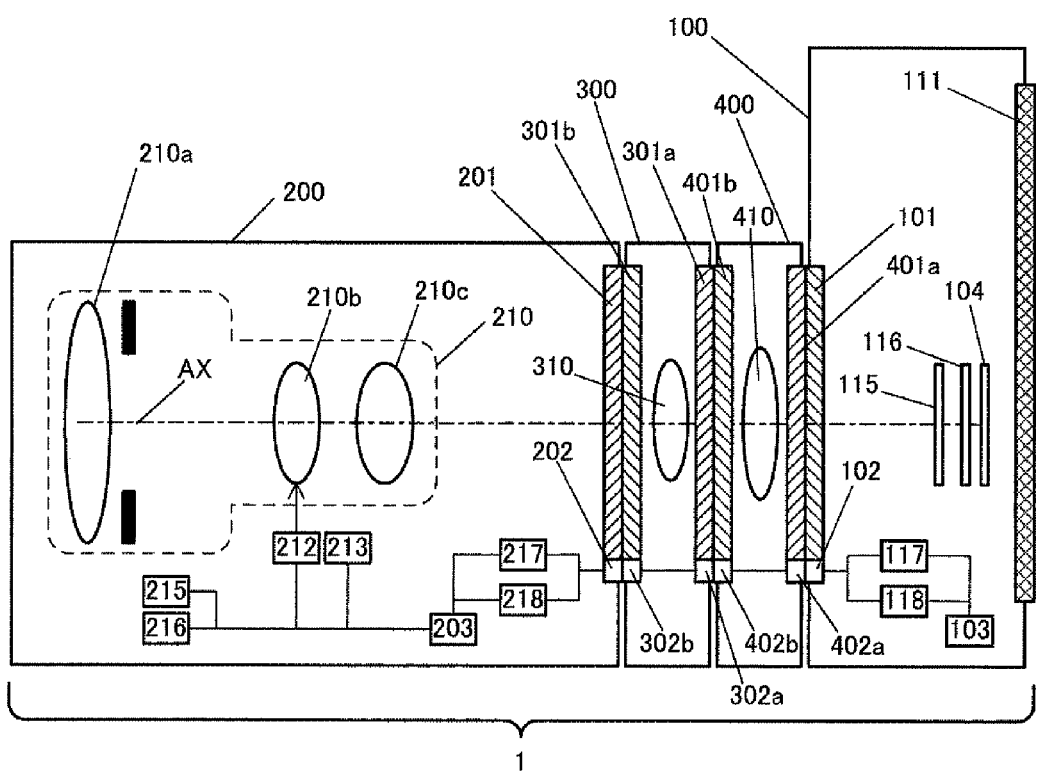
FIG. 17 is a sectional view of the camera system compatible with exchangeable lenses achieved by adopting the present invention.

FIG. 17 shows the camera system compatible with exchangeable lenses achieved by adopting the present invention in a sectional view. A lens 410 is disposed inside the intermediate adapter 400 on an optical axis matching the optical axis AX of the image forming optical system 210. The focal length of the image forming optical system 210 is increased via the lens 410 by a predetermined ratio, relative to the focal length achieved at the image forming optical system 210 when the lens 410 is not present. It is to be noted that the lens 410 may not be provided in the intermediate adapter 400. The intermediate adapter 400 without the lens 410 functions as a general adapter.

Figure 18:
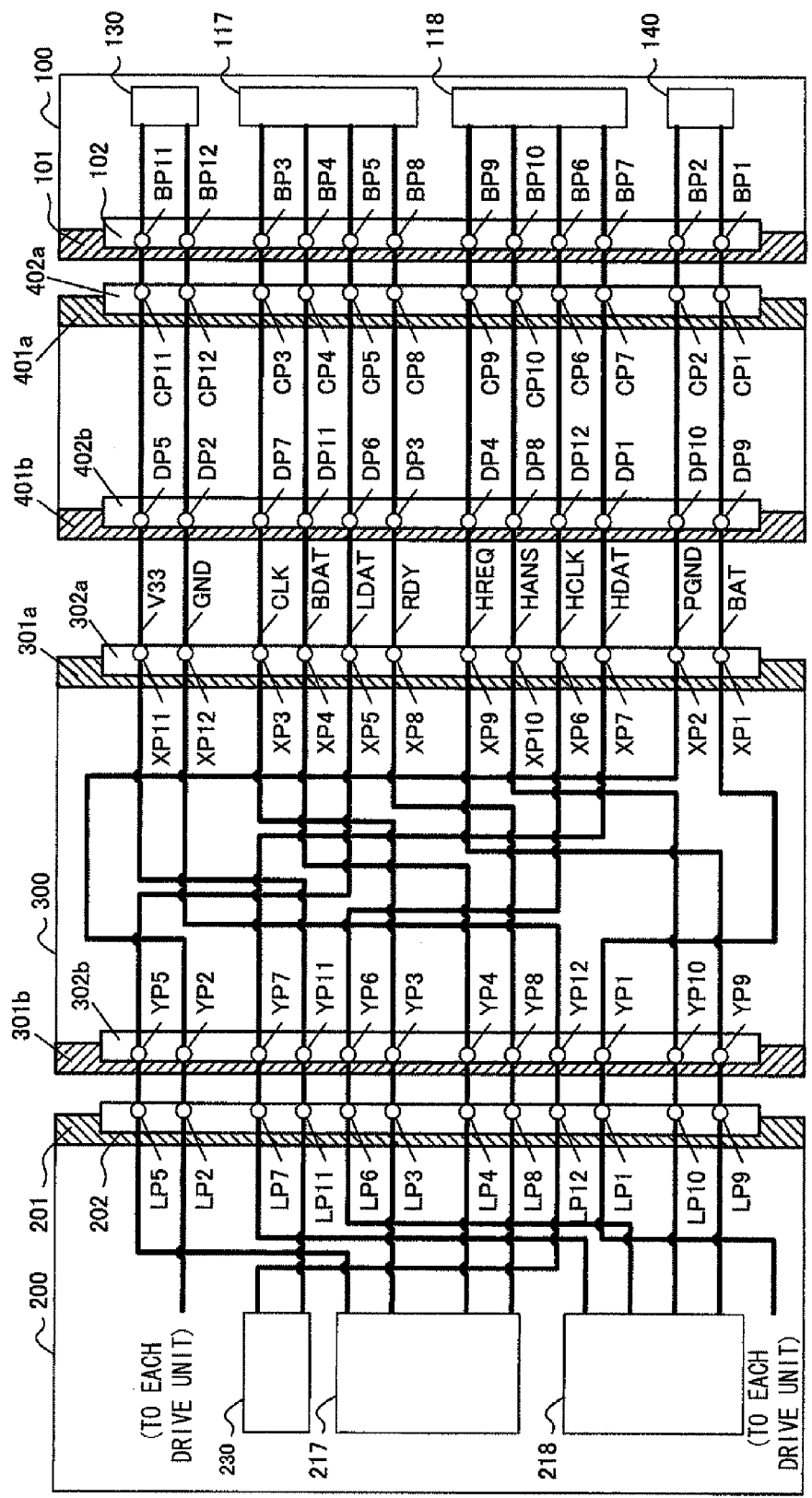

FIG. 18 schematically illustrates a mode of connection adopted in conjunction with the various terminals present at the camera body 100, the exchangeable lens 200 and in between. As FIG. 18 indicates, twelve body-side through connector terminals CP1 through CP12, which respectively correspond to the twelve body connector terminals BP1 through BP12, are held in the BT holding portion 402a at the intermediate adapter 400. The twelve body-side through connector terminals CP1 through CP12 (their exposed areas) are disposed at the BT holding portion 402a in a similar arrangement to that of the twelve body-side connector terminals XP1 through XP12 (their exposed areas) disposed in the intermediate adapter 300 in the first embodiment. In addition, twelve lens-side through connector terminals DP1 through DP12, each corresponding to one of the twelve body-side connector terminals XP1 through XP12, are present in the LT holding portion 402b at the intermediate adapter 400.

As shown in FIG. 18, the twelve body-side through connector terminals CP1 through CP12 are electrically connected respectively with the twelve lens-side through connector terminals DP1 through DP12 inside the intermediate adapter 400. Namely, the first body-side through connector terminal CP1, for instance, is electrically connected to the first lens-side through connector terminal DP1. In addition, the second body-side through connector terminal CP2 is electrically connected to the second lens-side through connector terminal DP2. The other body-side through connector terminals CP3 through CP12, too, are respectively connected to the lens-side through connector terminals DP3 through DP12.

This means that the electrical connection between the twelve body connector terminals BP1 through BP12 and the twelve body-side connector terminals XP1 through XP12 is the same as that assumed in the first embodiment, although the intermediate adapter 400 is present between them in the current embodiment. Namely, the body connector terminal BP1, for instance, is electrically connected to the body-side connector terminal XP1, as in the first embodiment, and the body connector terminal BP2, too, is electrically connected to the body-side connector terminal XP2, as in the first embodiment. The remaining body connector terminals BP3 through BP12 are also electrically connected to the body-side connector terminals XP3 through XP12 respectively.

As described above, the B mount unit 301a at the intermediate adapter 300 fits with the second mount unit 401b at the intermediate adapter 400, as well as with the camera body mount unit 101 at the camera body 100. In other words, the intermediate adapter 400, instead of the camera body 100, may be mounted at the B mount unit 301a at the intermediate adapter 300.

In other words, at the B mount unit 301a of the intermediate adapter 300 having a mount center point O1, the intermediate adapter 400, with the twelve lens-side through connector terminals DP1 through DP12 disposed near the second mount unit 401b at the intermediate adapter 400, is mounted. In addition, the twelve body-side connector terminals XP1 through XP12, each having a contact area to come into contact with one of the lens-side through connector terminals DP1 through DP12, are disposed in the B holding portion 302a of the intermediate adapter 300.

Advantages similar to those of the first embodiment are achieved with the camera system in the fourth embodiment described above.

The present invention allows for the following variations and one of the variations or a plurality of variations may be adopted in combination with any of the embodiments described above.

(Variation 1)

In the embodiments described above, the plurality of body-side connector terminals are disposed along the upper edge and the lower edge of the B holding portion 302a, as illustrated in FIGS. 5A and 5B. However, the present invention is not limited to this example and the plurality of body-side connector terminals may be disposed in the B holding portion 302a by adopting a different positional arrangement. In addition, the plurality of body-side connector terminals may be disposed at any positions within the B holding portion 302a and the B holding portion 302a may adopt any shape that may be different from the shape shown in FIGS. 5A and 5B.

(Variation 2)

The embodiments have been described by assuming that the position data indicating the position of the focusing lens 210b are transmitted from the exchangeable lens 200 to the camera body 100 through hotline communication. However, the present invention is not limited to this example and may be adopted in a system configured so as to transmit condition information pertaining to a drive target member other than the focusing lens through hotline communication. For instance, the present invention may be adopted in conjunction with an exchangeable lens 200 equipped with a blur correction lens, via which image blur attributable to unsteady handling during a photographing operation is corrected. In such a case, position data indicating the position of the blur correction lens (X,Y position) may be transmitted through hotline communication. Furthermore, the present invention may be adopted in a system in which position information indicating the position of the aperture included in the exchangeable lens (information related to the size of the aperture opening) is transmitted. Moreover, in conjunction with an exchangeable lens 200 that includes a zoom lens, information related to the focal length of the lens may be transmitted through hotline communication. Under such circumstances, the generation processing 501 in FIG. 7B will include processing for generating blur correction lens position data, processing for generating aperture control position data pertaining to the aperture used to form the aperture opening (position information corresponding to the opening size), or processing for generating zoom lens position data.

(Variation 3)

The holding portion 102 (on the body-side) and the holding portion 202 (on the lens-side), the B holding portion 302a and the L holding portion 302b are each manufactured as an integrated component (single component) in the embodiments described earlier. However, the present invention is not limited to this example and it may be adopted in conjunction with holding portions each constituted with a plurality of separate holding portion parts, with one part corresponding to a specific number of terminals, which are put together as a single assembly.

(Variation 4)

While the camera system described in reference to the embodiments includes two separate sets of communication interfaces in correspondence to two different types of communication (hotline communication and command data communication), the present invention may be adopted in conjunction with an integrated communication interface. Namely, the first lens-side communication unit 217 and the second lens-side communication unit 218 on the exchangeable lens side may be integrated into a single communication unit. Likewise, the first body-side communication unit 117 and the second body-side communication unit 118 on the camera body side may be integrated into a single communication unit. Furthermore, a body control unit and a lens control unit with built-in functions enabling them to fulfill the functions of the corresponding communication interfaces, instead of the body control unit 103 and the lens control unit 203, may be utilized.

(Variation 5)

In the second embodiment, the first lens-side communication unit 217 and the first adapter-side communication unit 617 exchange data through command data communication. These two communication units may instead exchange data through a communication procedure (procedure) other than that for command data communication. For instance, terminals arrayed and wired differently from those shown in FIG. 11 may be disposed in the L holding portion 302b and the holding portion 202 and data communication may be executed through these terminals. In this case, the first adapter-side communication unit 617 functions as a translator that translates the contents of data from the exchangeable lens 200 to communication data suited for the camera body 100. By configuring the intermediate adapter 600 in this manner, even an exchangeable lens in compliance with a communication procedure completely different from that of the command data communication can be utilized in conjunction with the camera body 100. In other words, the first adapter-side communication unit is capable of functioning as a first communication unit engaged in data communication with the camera body 100 through a first communication procedure, a second communication unit engaged in data communication with the exchangeable lens through a second communication procedure different from the first communication procedure, and a control data exchange unit that receives first control data expressing a specific control instruction from the camera body 100 and transmits second control data expressing the control instruction, which are different from the first control data, to the exchangeable lens 200 via the second communication unit upon receiving the first control data. This principle also applies to the second adapter-side communication unit 618. Namely, it may be engaged in data communication carried out through a procedure other than that for hotline communication.

(Variation 6)

Figure 12:
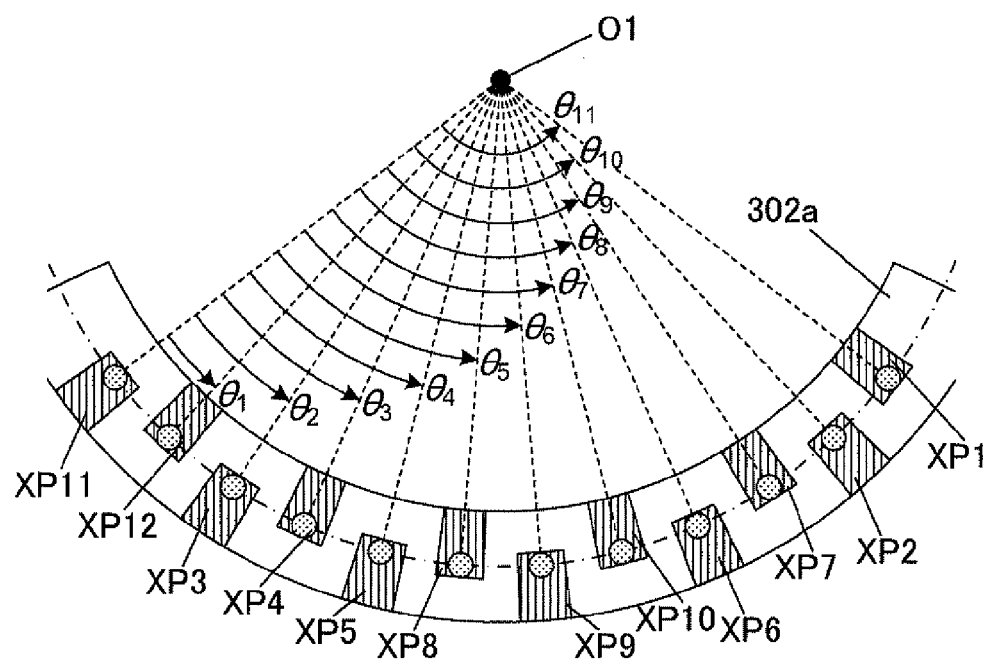
FIG. 12 is a front view of a B mount unit.

In the first embodiment, the twelve body-side connector terminals XP1 through XP12 are disposed in the B holding portion 302a so that the centers of the individual terminals (the centers of their exposed areas) are set apart from the mount center point O1 of the B mount unit 301a by distances equal to one another. As an alternative, at least one body-side connector terminal may be disposed at a position at which the center of the particular terminal (the center of its exposed area) is set apart from the mount center point O1 by a distance different from the distance setting apart the centers of the other body-side connector terminals from the mount center point O1. For instance, the twelve body-side connector terminals XP1 through XP12 (their exposed areas) may be disposed in a staggered pattern so that the centers of some body-side connector terminals are set apart from the mount center point O1 by a distance longer than that setting apart the centers of the remaining terminals from the mount center point O1, as illustrated in FIG. 12. Since the twelve body-side connector terminals XP1 through XP12 (their exposed areas) assume a sufficiently large size relative to the twelve body connector terminals BP1 through BP12 disposed in the holding portion 102, the individual terminals in the holding portion 102 can be connected with the corresponding terminals in the B holding portion 302a with a high level of reliability even when the body-side connector terminals are disposed in such a staggered pattern.

Furthermore, at least one lens-side connector terminal among the twelve lens-side connector terminals YP1 through YP12 (their exposed areas) disposed in the L holding portion 302b may be disposed at a position at which the center of the particular terminal (the center of its exposed area) is set apart from the mount center point O2 by a distance different from the distance setting apart the centers of the other lens-side connector terminals from the mount center point O2. For instance, the lens-side connector terminals may also be disposed in a staggered pattern.

(Variation 7)

Figure 13:
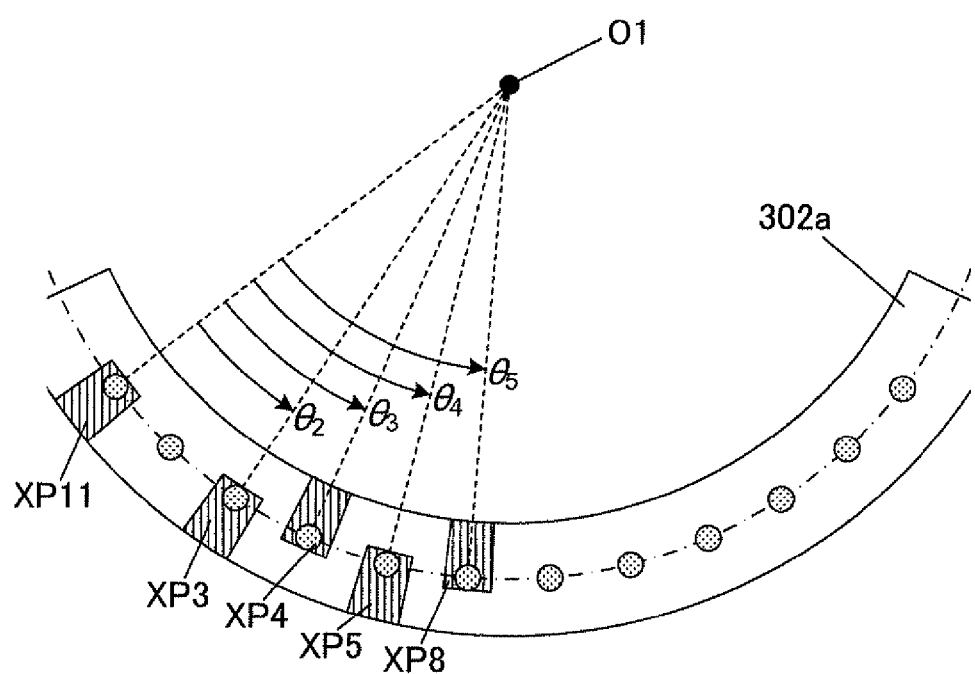
FIG. 13 is a front view of a B mount unit.

Not all twelve body-side connector terminals XP1 through XP12 (their exposed areas) need to be disposed in the B holding portion 302a in the first embodiment. For instance, only five body-side connector terminals XP3, XP4, XP5, XP8 and XP11 may be disposed in the B holding portion 302a, as shown in FIG. 13. In other words, the first body-side connector terminal XP1, through which the drive voltage for the lens drive unit 212 is provided, the second body-side connector terminal XP2, functioning as a ground terminal for the first lens connector terminal LP1, and the twelfth body-side connector terminal XP12 functioning as a ground terminal corresponding to operating voltage provided to various units other than the lens drive unit 212, as well as the body-side connector terminals XP6, XP7, XP9 and XP10 used in hotline communication in the previous embodiments, can be omitted. These connector terminals do not need to be included in the holding portion for the following reason.

For instance, the exchangeable lens 200 mounted at the L mount unit 301b may be a manual-focus lens without an autofocus function. Such an exchangeable lens 200 does not include a lens drive unit 212 and the focusing lens 210b is adjusted by the photographer by manually operating the focus ring. This means that the system in this variation does not require the first body-side connector terminal XP1, through which the drive voltage for the lens drive unit 212 is provided and the second body-side connector terminal XP2 functioning as the ground terminal for the first body-side connector terminal XP1, i.e., these body-side connector terminals do not need to be disposed in the B holding portion 302a. In addition, unless an autofocus function is engaged, there is no need to transmit information indicating the position of the focusing lens 210b to the camera body 100 through hotline communication and thus, there is no need for the communication system terminals for hotline communication (i.e., the ninth body-side connector terminal XP9, the tenth body-side connector terminal XP10, the sixth body-side connector terminal XP6 and the seventh body-side connector terminal XP7). Namely, these body-side connector terminals for hotline communication do not need to be disposed in the B holding portion 302a. Furthermore, the twelfth body-side connector terminal XP12, the function of which can be fulfilled by the second body-side connector terminal XP2, would be redundant.

Exactly the same principle applies to the L holding portion 302b. Namely, not all twelve lens-side connector terminals YP1 through YP12 need to be disposed in the L holding portion 302b. For instance, at least five lens-side connector terminals YP3, YP4, YP5, YP8 and YP11 alone may be disposed in the L holding portion 302b. In other words, the lens-side connector terminals YP6, YP7, YP9 and YP10 used for hotline communication, the first lens-side connector terminal YP1 through which the drive voltage for the lens drive unit 212 is provided, the second lens-side connector terminal functioning as the ground terminal for the first lens-side connector terminal YP1 and the twelfth lens-side connector terminal YP12 functioning as a ground terminal corresponding to the operating voltage for various units other than the lens drive unit 212 may be omitted.

(Variation 8)

While the camera system achieved in the fourth embodiment described above includes two intermediate adapters 300 and 400, the present invention is not limited to this example and it may be adopted in a camera system with a greater number of intermediate adapters. In addition, the positional relationship between the intermediate adapters, the shapes of the mounts included at the individual intermediate adapters, the positional arrangements adopted in conjunction with the connector terminals, the wiring layouts with which the connector terminals are connected within the intermediate adapters and the like, having been described in reference to the fourth embodiment, may be modified as desired.

For instance, an intermediate adapter 300 similar to that in the first embodiment may be mounted at the camera body 100 and an intermediate adapter (accessory) similar to the intermediate adapter 400 may be mounted between the intermediate adapter 300 and the exchangeable lens 200. Furthermore, the shapes of the mounts at the intermediate adapter 400 and the camera body 100 may be different from the shapes of the mounts at the intermediate adapter 300 and the exchangeable lens 200. Namely, the intermediate adapter 300 or the intermediate adapter 400 may be an intermediate adapter that allows a camera body 100 and an exchangeable lens 200 conforming to different mount specifications to be utilized together.

In addition, fewer than twelve connector terminals may be disposed in a holding portion, as has been explained earlier in reference to variation 7. Furthermore, the connector terminal positional arrangement, wiring layout, positions and the like may be altered.

The embodiments of the present invention described above enable two communication systems independent of each other to carry out communication without adversely affecting each other.

As long as the features characterizing the present invention are not compromised, the present invention is not limited to the particulars of the embodiments described above, and other modes that are conceivable within the technical scope of the present invention are also within the scope of the invention. In addition, the embodiments and variations thereof may be adopted in any conceivable combination.

What is claimed is:

1. An intermediate adapter, comprising:
    a first mount unit having a first mount center point, at which a camera body, with twelve body connector terminals disposed near a camera body mount unit at the camera body, is mounted;
    a body-side connector terminal holding portion where twelve body-side connector terminals, each connected to one of the twelve body connector terminals and each including a contact area to come into contact with one of the body connector terminals, are disposed;
    a second mount unit having a second mount center point, at which a camera accessory is to be detachably mounted,
    wherein:
    the twelve body-side connector terminals are:
        a first body-side connector terminal through which a first voltage is provided from the camera body;
        a second body-side connector terminal that functions as a ground terminal corresponding to the first voltage;
        a third body-side connector terminal through which a first clock signal is input from the camera body;
        a fourth body-side connector terminal through which a first data signal is input from the camera body in synchronization with the first clock signal;
        a fifth body-side connector terminal through which a second data signal is output to the camera body in synchronization with the first clock signal;
        a sixth body-side connector terminal through which a second clock signal is input from the camera body;
        a seventh body-side connector terminal through which a third data signal is output to the camera body in synchronization with the second clock signal;
        an eighth body-side connector terminal through which a first asynchronous signal that is not synchronous with either the first clock signal or the second clock signal is output to the camera body;
        a ninth body-side connector terminal through which a second asynchronous signal that is not synchronous with either the first clock signal or the second clock signal is input from the camera body;
        a tenth body-side connector terminal through which a third asynchronous signal that is not synchronous with either the first clock signal or the second clock signal is output to the camera body;
        an eleventh body-side connector terminal through which a second voltage smaller than the first voltage, enabling reception of the first data signal from the camera body through the fourth body-side connector terminal and transmission of the second data signal to the camera body through the fifth body-side connector terminal based upon the first asynchronous signal output through the eighth body-side connector terminal and the first clock signal input through the third body-side connector terminal and also enabling transmission of the third data signal to the camera body through the seventh body-side connector terminal based upon the second asynchronous signal input through the ninth body-side connector terminal, the third asynchronous signal output through the tenth body-side connector terminal and the second clock signal input through the sixth body-side connector terminal, is provided from the camera body; and
        a twelfth body-side terminal that functions as a ground terminal corresponding to the second voltage;
    an interior angle formed by the contact area of the first body-side connector terminal and the contact area of the eleventh body-side connector terminal at the first mount center point is largest among interior angles, each formed by contact areas of any two body-side connector terminals among the twelve body-side connector terminals at the first mount center point;
    an interior angle formed by the contact area of the eleventh body-side connector terminal and the contact area of the twelfth body-side connector terminal at the first mount center point is smaller than an interior angle formed by the contact area of any body-side connector terminal among the first body-side connector terminal through the tenth body-side connector terminal and the contact area of the eleventh body-side connector terminal at the first mount center point;

an interior angle formed by the contact area of the third body-side connector terminal and the contact area of the eleventh body-side connector terminal at the first mount center point is smaller than an interior angle formed by the contact area of any body-side connector terminal among the first body-side connector terminal, the second body-side connector terminal and the fourth body-side connector terminal through the tenth body-side connector terminal and the contact area of the eleventh body-side connector terminal at the first mount center point;

an interior angle formed by the contact area of the fourth body-side connector terminal and the contact area of the eleventh body-side connector terminal at the first mount center point is smaller than an interior angle formed by the contact area of any body-side connector terminal among the first body-side connector terminal, the second body-side connector terminal and the fifth body-side connector terminal through the tenth body-side connector terminal and the contact area of the eleventh body-side connector terminal at the first mount center point;

an interior angle formed by the contact area of the fifth body-side connector terminal and the contact area of the eleventh body-side connector terminal at the first mount center point is smaller than an interior angle formed by the contact area of any body-side connector terminal among the first body-side connector terminal, the second body-side connector terminal and the sixth body-side connector terminal through the tenth body-side connector terminal and the contact area of the eleventh body-side connector terminal at the first mount center point;

an interior angle formed by the contact area of the eighth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal, the ninth body-side connector terminal and the tenth body-side connector terminal and the contact area of the eleventh body-side connector terminal at the first mount center point;

an interior angle formed by the contact area of the ninth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal and the tenth body-side connector terminal and the contact area of the eleventh body-side connector terminal at the first mount center point;

an interior angle formed by the contact area of the tenth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal and the seventh body-side connector terminal and the contact area of the eleventh body-side connector terminal at the first mount center point;

an interior angle formed by the contact area of the sixth body-side connector terminal and the contact area of the eleventh body-side connector terminal at the first mount center point is smaller than an interior angle formed by the contact area of any body-side connector terminal among the first body-side connector terminal, the second body-side connector terminal and the seventh body-side connector terminal and the contact area of the eleventh body-side connector terminal at the first mount center point;

an interior angle formed by the contact area of the seventh body-side connector terminal and the contact area of the eleventh body-side connector terminal at the first mount center point is smaller than an interior angle formed by the contact area of either the first body-side connector terminal or the second body-side connector terminal and the contact area of the eleventh body-side connector terminal at the first mount center point; and an interior angle formed by the contact area of the second body-side connector terminal and the contact area of the eleventh body-side connector terminal at the first mount center point is smaller than an interior angle formed by the contact area of the first body-side connector terminal and the contact area of the eleventh body-side connector terminal at the first mount center point.

2. An intermediate adapter according to claim 1, wherein:
a distance setting apart a center of at least one body-side connector terminal among the twelve body-side connector terminals from the first mount center point is different from a distance setting apart a center of at least one other body-side connector terminal, from the first mount center point.

3. An intermediate adapter according to claim 1, further comprising:
an accessory-side connector terminal holding portion where a plurality of accessory-side connector terminals, each electrically connected to one of the twelve body-side connector terminals and each including a contact area to come into contact with one accessory connector terminal, are disposed.

4. An intermediate adapter according to claim 3, wherein:
at least two accessory-side connector terminals among the plurality of accessory-side connector terminals have a positional relationship relative to each other along a circumferential direction running along a circumference of a circle centered on the second mount center point, which is different from a positional relationship between at least two body-side connector terminals among the twelve body-side connector terminals assumed along a circumference of a circle centered on the first mount center point.

5. An intermediate adapter according to claim 3, comprising:
the accessory-side connector terminal holding portion where twelve accessory-side connector terminals, each electrically connected to one of the twelve body-side connector terminals and each including the contact area to come into contact with one accessory connector terminal, are disposed, wherein:
the twelve accessory-side connector terminals are each connected to one of twelve accessory connector terminals disposed near a mount unit at the camera accessory that can be detachably mounted at the second mount unit.

6. An intermediate adapter according to claim 5, wherein:
at least two accessory-side connector terminals among the twelve accessory-side connector terminals have a positional relationship relative to each other along a circumferential direction running along a circumference of a circle centered on the second mount center point, which is different from a positional relationship between at least two body-side connector terminals among the twelve body-side connector terminals assumed along a circumference of a circle centered on the first mount center point.

7. An intermediate adapter according to claim 1, further comprising:
an accessory-side connector terminal holding portion where a plurality of accessory-side connector terminals are disposed;
a communication unit to be engaged in data communication with the camera body and the camera accessory; and
a control data exchange unit that receives, via the communication unit, first control data expressing a specific control instruction from the camera body and transmits, upon receiving the first control data, second control data expressing the control instruction, which are different from the first control data, through at least one of the twelve body-side connector terminals to the camera accessory via the communication unit.

8. An intermediate adapter according to claim 1, further comprising:
an optical member that outputs subject light, having been transmitted through an image forming optical system included in the camera accessory to the camera body.

9. An intermediate adapter, comprising:
a first mount unit having a first mount center point, at which a camera body, with twelve body connector terminals disposed near a camera body mount unit at the camera body, is mounted;
a body-side connector terminal holding portion where at least five body-side connector terminals, each including a contact area to come into contact with one of the body connector terminals, are disposed; and
a second mount unit having a second mount center point at which a camera accessory is to be detachably mounted, wherein:
the five body-side connector terminals are:
a clock input body-side connector terminal through which a clock signal from the camera body is input;
a data input body-side connector terminal through which a first data signal from the camera body is input in synchronization with the clock signal;
a data output body-side connector terminal through which a second data signal is output to the camera body in synchronization with the clock signal;
an asynchronous signal output body-side connector terminal through which an asynchronous signal that is not synchronous with the clock signal is output to the camera body; and
a voltage supply body-side connector terminal through which an operating voltage, enabling reception of the first data signal from the camera body through the data input body-side connector terminal and transmission of the second data signal to the camera body through the data output body-side connector terminal based upon the asynchronous signal output through the asynchronous signal output body-side connector terminal and the clock signal input through the clock input body-side connector terminal, is provided from the camera body;
an interior angle formed by the contact area of the asynchronous signal output body-side connector terminal and the contact area of the voltage supply body-side connector terminal at the first mount center point is largest among interior angles, each formed by contact areas of any two body-side connector terminals among the five body-side connector terminals at the first mount center point;
an interior angle formed by the contact area of the clock input body-side connector terminal and the contact area of the voltage supply body-side connector terminal at the first mount center point is smaller than an interior angle formed by the contact area of any body-side connector terminal among the data input body-side connector terminal, the data output body-side connector terminal and the asynchronous signal output body-side connector terminal and the contact area of the voltage supply body-side connector terminal at the first mount center point;
an interior angle formed by the contact area of the data input body-side connector terminal and the contact area of the voltage supply body-side connector terminal at the first mount center point is smaller than an interior angle formed by the contact area of either the data output body-side connector terminal or the asynchronous signal output body-side connector terminal and the contact area of the voltage supply body-side connector terminal at the first mount center point; and
an interior angle formed by the contact area of the data output body-side connector terminal and the contact area of the voltage supply body-side connector terminal at the first mount center point is smaller than an interior angle formed by the contact area of the asynchronous signal output body-side connector terminal and the contact area of the voltage supply body-side connector terminal at the first mount center point.

10. An intermediate adapter according to claim 9, wherein:
a distance setting apart a center of at least one body-side connector terminal among the five body-side terminals from the first mount center point is different from a distance setting apart a center of at least one other body-side connector terminal from the first mount center point.

11. An intermediate adapter according to claim 9, further comprising:
an accessory-side connector terminal holding portion where a plurality of accessory-side connector terminals, each electrically connected to one of the five body-side connector terminals and each including a contact area to come into contact with one accessory connector terminal, are disposed.

12. An intermediate adapter according to claim 11, wherein:
at least two accessory-side connector terminals among the plurality of accessory-side connector terminals have a positional relationship relative to each other along a circumferential direction running along a circumference of a circle centered on the second mount center point, which is different from a positional relationship between at least two body-side connector terminals among the five body-side connector terminals assumed along a circumference of a circle centered on the first mount center point.

13. An intermediate adapter according to claim 11, comprising:
the accessory-side connector terminal holding portion where at least five accessory-side connector terminals, each electrically connected to one of the five body-side connector terminals and each including the contact area to come into contact with one accessory connector terminal, are disposed, wherein:
the five accessory-side connector terminals are each connected to one of at least five accessory connector terminals disposed near mount unit of the camera accessory that can be detachably mounted at the second mount unit.

14. An intermediate adapter according to claim 13, wherein:
at least two accessory-side connector terminals among the five accessory-side connector terminals have a positional relationship relative to each other along a circumferential direction running along a circumference of a circle centered on the second mount center point, which is different from a positional relationship between at least two body-side connector terminals among the five body-side connector terminals assumed along a circumference of a circle centered on the first mount center point.

15. An intermediate adapter according to claim 9, further comprising:
an accessory-side connector terminal holding portion where a plurality of accessory-side connector terminals are disposed;
a communication unit to be engaged in data communication with the camera body and the camera accessory; and
a control data exchange unit that receives, via the communication unit, first control data expressing a specific control instruction from the camera body and transmits, upon receiving the first control data, second control data expressing the control instruction, which are different from the first control data, through at least one of the five body-side connector terminals to the camera accessory via the communication unit.

16. An intermediate adapter, comprising:
a first mount unit having a first mount center point, at which a camera body, with twelve body connector terminals disposed near a camera body mount unit at the camera body, is mounted;
a body-side connector terminal holding portion where twelve body-side connector terminals, each connected to one of the twelve body connector terminals and each including a contact area to come into contact with one of the body connector terminals, are disposed;
a second mount unit having a second mount center point, at which a camera accessory is to be detachably mounted, wherein:
the twelve body-side connector terminals, each including a body-side exposed area exposed at a surface of the body-side connector terminal holding portion, are:
a first body-side connector terminal through which a first voltage is provided from the camera body;
a second body-side connector terminal that functions as a ground terminal corresponding to the first voltage;
a third body-side connector terminal through which a first clock signal is input from the camera body;
a fourth body-side connector terminal through which a first data signal is input from the camera body in synchronization with the first clock signal;
a fifth body-side connector terminal through which a second data signal is output to the camera body in synchronization with the first clock signal;
a sixth body-side connector terminal through which a second clock signal is input from the camera body;
a seventh body-side connector terminal through which a third data signal is output to the camera body in synchronization with the second clock signal;
an eighth body-side connector terminal through which a first asynchronous signal that is not synchronous with either the first clock signal or the second clock signal is output to the camera body;
a ninth body-side connector terminal through which a second asynchronous signal that is not synchronous with either the first clock signal or the second clock signal is input from the camera body;
a tenth body-side connector terminal through which a third asynchronous signal that is not synchronous with either the first clock signal or the second clock signal is output to the camera body;
an eleventh body-side connector terminal through which a second voltage smaller than the first voltage, enabling reception of the first data signal from the camera body through the fourth body-side connector terminal and transmission of the second data signal to the camera body through the fifth body-side connector terminal based upon the first asynchronous signal output through the eighth body-side connector terminal and the first clock signal input through the third body-side connector terminal and also enabling transmission of the third data signal to the camera body through the seventh body-side connector terminal based upon the second asynchronous signal input through the ninth body-side connector terminal, the third asynchronous signal output through the tenth body-side connector terminal and the second clock signal input through the sixth body-side connector terminal, is provided from the camera body; and
a twelfth body-side terminal that functions as a ground terminal corresponding to the second voltage;
an interior angle formed by the contact area of the first body-side connector terminal and the contact area of the eleventh body-side connector terminal at the first mount center point is largest among interior angles, each formed by contact areas of any two body-side connector terminals among the twelve body-side connector terminals at the first mount center point;
an interior angle formed by the contact area of the eleventh body-side connector terminal and the contact area of the twelfth body-side connector terminal at the first mount center point is smaller than an interior angle formed by the contact area of any body-side connector terminal among the first body-side connector terminal through the tenth body-side connector terminal and the contact area of the eleventh body-side connector terminal at the first mount center point;
an interior angle formed by the contact area of the third body-side connector terminal and the contact area of the eleventh body-side connector terminal at the first mount center point is smaller than an interior angle formed by the contact area of any body-side connector terminal among the first body-side connector terminal, the second body-side connector terminal and the fourth body-side connector terminal through the tenth body-side connector terminal and the contact area of the eleventh body-side connector terminal at the first mount center point;
an interior angle formed by the contact area of the fourth body-side connector terminal and the contact area of the eleventh body-side connector terminal at the first mount center point is smaller than an interior angle formed by the contact area of any body-side connector terminal among the first body-side connector terminal, the second body-side connector terminal and the fifth body-side connector terminal through the tenth body-side connector terminal and the contact area of the eleventh body-side connector terminal at the first mount center point;

an interior angle formed by the contact area of the fifth body-side connector terminal and the contact area of the eleventh body-side connector terminal at the first mount center point is smaller than an interior angle formed by the contact area of any body-side connector terminal among the first body-side connector terminal, the second body-side connector terminal and the sixth body-side connector terminal through the tenth body-side connector terminal and the contact area of the eleventh body-side connector terminal at the first mount center point;

an interior angle formed by the contact area of the eighth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal, the ninth body-side connector terminal and the tenth body-side connector terminal and the contact area of the eleventh body-side connector terminal at the first mount center point;

an interior angle formed by the contact area of the ninth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal, the seventh body-side connector terminal and the tenth body-side connector terminal and the contact area of the eleventh body-side connector terminal at the first mount center point;

an interior angle formed by the contact area of the tenth body-side connector terminal and the contact area of the eleventh body-side connector terminal at the first mount center point is smaller than an interior angle formed by the contact area of any body-side connector terminal among the first body-side connector terminal, the second body-side connector terminal, the sixth body-side connector terminal and the seventh body-side connector terminal and the contact area of the eleventh body-side connector terminal at the first mount center point;

an interior angle formed by the contact area of the sixth body-side connector terminal and the contact area of the eleventh body-side connector terminal at the first mount center point is smaller than an interior angle formed by the contact area of any body-side connector terminal among the first body-side connector terminal, the second body-side connector terminal and the seventh body-side connector terminal and the contact area of the eleventh body-side connector terminal at the first mount center point;

an interior angle formed by the contact area of the seventh body-side connector terminal and the contact area of the eleventh body-side connector terminal at the first mount center point is smaller than an interior angle formed by the contact area of either the first body-side connector terminal or the second body-side connector terminal and the contact area of the eleventh body-side connector terminal at the first mount center point; and an interior angle formed by the contact area of the second body-side connector terminal and the contact area of the eleventh body-side connector terminal at the first mount center point is smaller than an interior angle formed by the contact area of the first body-side connector terminal and the contact area of the eleventh body-side connector terminal at the first mount center point.

17. An intermediate adapter according to claim 16, wherein:
a distance setting apart a center of the body-side exposed area of at least one body-side connector terminal, among the twelve body-side connector terminals, from the first mount center point is different from a distance setting apart a center of the body-side exposed area of at least one other body-side connector terminal from the first mount center point.

18. An intermediate adapter according to claim 16, further comprising:
an accessory-side connector terminal holding portion where a plurality of accessory-side connector terminals, each electrically connected to one of the twelve body-side connector terminals and each including a contact area to come into contact with one accessory connector terminal, are disposed, wherein:
the plurality of accessory-side connector terminals each include an accessory-side exposed area exposed at a surface of the accessory-side connector terminal holding portion.

19. An intermediate adapter according to claim 18, wherein:
accessory-side exposed areas of at least two accessory-side connector terminals among the plurality of accessory-side connector terminals have a positional relationship relative to each other along a circumferential direction running along a circumference of a circle centered on the second mount center point, which is different from a positional relationship between body-side exposed areas of at least two body-side connector terminals among the twelve body-side connector terminals assumed along the circumference of a circle centered on the first mount center point.

20. An intermediate adapter according to claim 18, comprising:
the accessory-side connector terminal holding portion where twelve accessory-side connector terminals, each electrically connected to one of the twelve body-side connector terminals and each including the contact area to come into contact with one accessory connector terminal, are disposed, wherein:
the twelve accessory-side connector terminals each include an accessory-side exposed area exposed at a surface of the accessory-side connector terminal holding portion and are each connected to one of twelve accessory connector terminals disposed near a mount unit at the camera accessory that can be detachably mounted at the second mount unit.

21. An intermediate adapter according to claim 20, wherein:
accessory-side exposed areas of at least two accessory-side connector terminals among the twelve accessory-side connector terminals have a positional relationship relative to each other along a circumferential direction running along a circumference of a circle centered on the second mount center point, which is different from a positional relationship between body-side exposed areas of at least two body-side connector terminals among the twelve body-side connector terminals assumed along a circumference of a circle centered on the first mount center point.

22. An intermediate adapter, comprising:
a first mount unit having a first mount center point, at which a camera body, with twelve body connector terminals disposed near a camera body mount unit at the camera body, is mounted;
a body-side connector terminal holding portion where at least five body-side connector terminals, each including a contact area to come into contact with one of the body connector terminals, are disposed; and
a second mount unit having a second mount center point, at which a camera accessory can be detachably mounted, wherein:
the five body-side connector terminals, each including a body-side exposed area exposed at a surface of the body-side connector terminal holding portion, are:
a clock input body-side connector terminal through which a clock signal from the camera body is input;
a data input body-side connector terminal through which a first data signal from the camera body is input in synchronization with the clock signal;
a data output body-side connector terminal through which a second data signal is output to the camera body in synchronization with the clock signal;
an asynchronous signal output body-side connector terminal through which an asynchronous signal that is not synchronous with the clock signal is output to the camera body; and
a voltage supply body-side connector terminal through which an operating voltage, enabling reception of the first data signal from the camera body through the data input body-side connector terminal and transmission of the second data signal to the camera body through the data output body-side connector terminal based upon the asynchronous signal output through the asynchronous signal output body-side connector terminal and the clock signal input through the clock input body-side connector terminal, is provided from the camera body;
an interior angle formed by the contact area of the asynchronous signal output body-side connector terminal and the contact area of the voltage supply body-side connector terminal at the first mount center point is largest among interior angles, each formed by contact areas of any two body-side connector terminals among the five body-side connector terminals at the first mount center point;
an interior angle formed by the contact area of the clock input body-side connector terminal and the contact area of the voltage supply body-side connector terminal at the first mount center point is smaller than an interior angle formed by the contact area of any body-side connector terminal among the data input body-side connector terminal, the data output body-side connector terminal and the asynchronous signal output body-side connector terminal and the contact area of the voltage supply body-side connector terminal at the first mount center point;
an interior angle formed by the contact area of the data input body-side connector terminal and the contact area of the voltage supply body-side connector terminal at the first mount center point is smaller than an interior angle formed by the contact area of either the data output body-side connector terminal or the asynchronous signal output body-side connector terminal and the contact area of the voltage supply body-side connector terminal at the first mount center point; and
an interior angle formed by the contact area of the data output body-side connector terminal and the contact area of the voltage supply body-side connector terminal is smaller than an interior angle formed by the contact area of the asynchronous signal output body-side connector terminal and the contact area of the voltage supply body-side connector terminal.

23. An intermediate adapter according to claim 22, wherein:
a distance setting apart a center of the body-side exposed area of at least one body-side connector terminal among the five body-side terminals from the first mount center point is different from a distance setting apart a center of the body-side exposed area of at least one other body-side connector terminal from the first mount center point.

24. An intermediate adapter according to claim 22, further comprising:
an accessory-side connector terminal holding portion where a plurality of accessory-side connector terminals, each electrically connected to one of the five body-side connector terminals and each including a contact area to come into contact with one accessory connector terminal, are disposed, wherein:
the plurality of accessory-side connector terminals each include an accessory-side exposed area exposed at a surface of the accessory-side connector terminal holding portion.

25. An intermediate adapter according to claim 24, wherein:
accessory-side exposed areas of at least two accessory-side connector terminals among the plurality of accessory-side connector terminals have a positional relationship relative to each other along a circumferential direction running along a circumference of a circle centered on the second mount center point, which is different from a positional relationship between body-side exposed areas of at least two body-side connector terminals among the five body-side connector terminals along a circumference of a circle centered on the first mount center point.

26. An intermediate adapter according to claim 24, comprising:
the accessory-side connector terminal holding portion where at least five accessory-side connector terminals, each electrically connected to one of the five body-side connector terminals and each including the contact area to come into contact with one accessory connector terminal, are disposed, wherein:
the five accessory-side connector terminals each include an accessory-side exposed area exposed at the surface of the accessory-side connector terminal holding portion and are each connected to one of at least five accessory connector terminals disposed near a mount unit at the camera accessory that can be detachably mounted at the second mount unit.

27. An intermediate adapter according to claim 21, wherein:
a positional relationship between accessory-side exposed areas of at least two accessory-side connector terminals among the five accessory-side connector terminals, assumed relative to the second mount center point, is different from a positional relationship between body-side exposed areas of at least two body-side connector terminals among the five body-side connector terminals, assumed relative to the first mount center point.

28. A camera accessory, comprising:

a first mount unit having a first mount center point, at which an intermediate adapter with twelve adapter connector terminals disposed near an adapter mount unit at the intermediate adapter, is attached;

an adapter-side connector terminal holding portion where twelve adapter-side connector terminals, each connected to one of the twelve adapter connector terminals and each including a contact area to come into contact with one of the adapter connector terminals, are disposed;

a second mount unit having a second mount center point, at which a camera accessory can be detachably mounted; and an accessory-side connector terminal holding portion where twelve accessory-side connector terminals, each electrically connected to one of the twelve adapter-side connector terminals and each including a contact area to come into contact with an accessory connector terminal, are disposed, wherein:

the twelve adapter-side connector terminals are:
  a first adapter-side connector terminal through which a first voltage is provided from the intermediate adapter;
  a second adapter-side connector terminal that functions as a ground terminal corresponding to the first voltage;
  a third adapter-side connector terminal through which a first clock signal is input from the intermediate adapter;
  a fourth adapter-side connector terminal through which a first data signal is input from the intermediate adapter in synchronization with the first clock signal;
  a fifth adapter-side connector terminal through which a second data signal is output to the intermediate adapter in synchronization with the first clock signal;
  a sixth adapter-side connector terminal through which a second clock signal is input from the intermediate adapter;
  a seventh adapter-side connector terminal through which a third data signal is output to the intermediate adapter in synchronization with the second clock signal;
  an eighth adapter-side connector terminal through which a first asynchronous signal that is not synchronous with the first clock signal or the second clock signal is output to the intermediate adapter;
  a ninth adapter-side connector terminal through which a second asynchronous signal that is not synchronous with the first clock signal or the second clock signal is input from the intermediate adapter;
  a tenth adapter-side connector terminal through which a third asynchronous signal that is not synchronous with the first clock signal or the second clock signal is output to the intermediate adapter;
  an eleventh adapter-side connector terminal through which a second voltage, smaller than the first voltage, enabling reception of the first data signal from the intermediate adapter through the fourth adapter-side connector terminal and transmission of the second data signal to the intermediate adapter through the fifth adapter-side connector terminal based upon the first asynchronous signal output through the eighth adapter-side connector terminal and the first clock signal input through the third adapter-side connector terminal and also enabling transmission of the third data signal to the intermediate adapter through the seventh adapter-side connector terminal based upon the second asynchronous signal input through the ninth adapter-side connector terminal, the third asynchronous signal output through the tenth adapter-side connector terminal and the second clock signal input through the sixth adapter-side connector terminal, is provided from the intermediate adapter; and
  a twelfth adapter-side connector terminal that functions as a ground terminal corresponding to the second voltage; and at least two accessory-side connector terminals among the twelve accessory-side connector terminals have a positional relationship relative to each other along a circumferential direction running along a circumference of a circle centered on the second mount center point, which is different from a positional relationship between at least two adapter-side connector terminals among the twelve adapter-side connector terminals assumed along a circumference of a circle centered on the first mount center point.

29. A camera accessory, comprising:

a first mount unit having a first mount center point, at which an intermediate adapter with at least five adapter connector terminals disposed near an adapter mount unit at the intermediate adapter, is attached;

an adapter-side connector terminal holding portion where at least five adapter-side connector terminals, each including a contact area to come into contact with one of the adapter connector terminals, are disposed;

a second mount unit having a second mount center point, at which a camera accessory can be detachably mounted; and an accessory-side connector terminal holding portion where at least five accessory-side connector terminals, each electrically connected to one of the five adapter-side connector terminals and each including a contact area to come into contact with an accessory connector terminal, are disposed, wherein:

the five adapter-side connector terminals are:
  a clock input adapter-side connector terminal through which a clock signal is input from the intermediate adapter;
  a data input adapter-side connector terminal through which a first data signal is input from the intermediate adapter in synchronization with the clock signal;
  a data output adapter-side connector terminal through which a second data signal is output to the intermediate adapter in synchronization with the clock signal;
  an asynchronous signal output adapter-side connector terminal through which an asynchronous signal that is not synchronous with the clock signal is output to the intermediate adapter; and
  a voltage supply adapter-side connector terminal through which an operating voltage, enabling reception of the first data signal from the intermediate adapter through the data input adapter-side connector terminal and transmission of the second data signal to the intermediate adapter through the data output adapter-side connector terminal based upon the asynchronous signal output through the asynchronous signal output adapter-side connector terminal and the clock signal input through the clock input adapter-side connector terminal, is provided from the intermediate adapter; and at least two accessory-side connector terminals among the five accessory-side connector terminals have a positional relationship relative to each other along a circumferential direction running along a circumference of a circle centered on the second mount center point, which is different from a positional relationship between at least two adapter-side connector terminals among the five adapter-side connector terminals assumed along a circumference of a circle centered on the first mount center point.

30. An exchangeable lens, comprising:
a mount unit having a mount center point, at which an intermediate adapter with twelve adapter connector terminals disposed near an adapter mount unit at the camera body, is attached; and
a lens-side connector terminal holding portion where twelve lens-side connector terminals, each connected to one of the twelve adapter connector terminals and each including a contact area to come into contact with one of the adapter connector terminals, are disposed, wherein:
the twelve lens-side connector terminals are:
  a first lens-side connector terminal through which a first voltage is provided from the intermediate adapter;
  a second lens-side connector terminal that functions as a ground terminal corresponding to the first voltage;
  a third lens-side connector terminal through which a first clock signal is input from the intermediate adapter;
  a fourth lens-side connector terminal through which a first data signal is input from the intermediate adapter in synchronization with the first clock signal;
  a fifth lens-side connector terminal through which a second data signal is output to the intermediate adapter in synchronization with the first clock signal;
  a sixth lens-side connector terminal through which a second clock signal is input from the intermediate adapter;
  a seventh lens-side connector terminal through which a third data signal is output to the intermediate adapter in synchronization with the second clock signal;
  an eighth lens-side connector terminal through which a first asynchronous signal that is not synchronous with the first clock signal or the second clock signal is output to the intermediate adapter;
  a ninth lens-side connector terminal through which a second asynchronous signal that is not synchronous with the first clock signal or the second clock signal is input from the intermediate adapter;
  a tenth lens-side connector terminal through which a third asynchronous signal that is not synchronous with the first clock signal or the second clock signal is output to the intermediate adapter;
  an eleventh lens-side connector terminal through which a second voltage, smaller than the first voltage, enabling reception of the first data signal from the intermediate adapter through the fourth lens-side connector terminal and transmission of the second data signal to the intermediate adapter through the fifth lens-side connector terminal based upon the first asynchronous signal output through the eighth lens-side connector terminal and the first clock signal input through the third lens-side connector terminal and also enabling transmission of the third data signal to the intermediate adapter through the seventh lens-side connector terminal based upon the second asynchronous signal input through the ninth lens-side connector terminal, the third asynchronous signal output through the tenth lens-side connector terminal and the second clock signal input through the sixth lens-side connector terminal, is provided from the intermediate adapter; and
  a twelfth lens-side connector terminal that functions as a ground terminal corresponding to the second voltage; and
at least two lens-side connector terminals among the twelve lens-side connector terminals have a positional relationship relative to each other along a circumferential direction running along a circumference of a circle centered on the mount center point, which is different from a positional relationship between at least two adapter connector terminals among the twelve adapter connector terminals assumed along a circumference of a circle centered on the mount center point.

31. An exchangeable lens, comprising:
a mount unit having a mount center point, at which an intermediate adapter with at least five adapter connector terminals disposed near an adapter mount unit at the intermediate adapter, is attached; and
a lens-side connector terminal holding portion where at least five lens-side connector terminals, each connected to one of the five adapter connector terminals and each including a contact area to come into contact with one of the adapter connector terminals, are disposed, wherein:
the five lens-side connector terminals are:
  a clock input lens-side connector terminal through which a clock signal is input from the intermediate adapter;
  a data input lens-side connector terminal through which a first data signal is input from the intermediate adapter in synchronization with the clock signal;
  a data output lens-side connector terminal through which a second data signal is output to the intermediate adapter in synchronization with the clock signal;
  an asynchronous signal output lens-side connector terminal through which an asynchronous signal that is not synchronous with the clock signal is output to the intermediate adapter; and
  a voltage supply lens-side connector terminal through which an operating voltage, enabling reception of the first data signal from the intermediate adapter through the data input lens-side connector terminal and transmission of the second data signal to the intermediate adapter through the data output lens-side connector terminal based upon the asynchronous signal output through the asynchronous signal output lens-side connector terminal and the clock signal input through the clock input lens-side connector terminal, is provided from the intermediate adapter; and
at least two lens-side connector terminals among the five lens-side connector terminals have a positional relationship relative to each other along a circumferential direction running along a circumference of a circle centered on the mount center point, which is different from a positional relationship between at least two adapter connector terminals among the five adapter connector terminals assumed along a circumference of a circle centered on the mount center point.

* * * * *